July 1, 1930.   W. J. WHITING   1,768,812
METHOD OF PRODUCING LIGHT EFFECTS
Filed Nov. 27, 1926   3 Sheets-Sheet 1

Inventor:
William J. Whiting,
By Spear, Middleton, Donaldson, Hall
Attorneys

July 1, 1930.  W. J. WHITING  1,768,812

METHOD OF PRODUCING LIGHT EFFECTS

Filed Nov. 27, 1926  3 Sheets-Sheet 2

Inventor:
William J. Whiting,
By Spear, Middleton, Donaldson & Hall
Attorneys

July 1, 1930.  W. J. WHITING  1,768,812
METHOD OF PRODUCING LIGHT EFFECTS
Filed Nov. 27, 1926   3 Sheets-Sheet 3

Inventor:
William J. Whiting,
By Spear, Middleton, Donaldson, Hall
Attorneys

Patented July 1, 1930

1,768,812

UNITED STATES PATENT OFFICE

WILLIAM J. WHITING, OF WASHINGTON, DISTRICT OF COLUMBIA

METHOD OF PRODUCING LIGHT EFFECTS

Application filed November 27, 1926. Serial No. 151,129.

This invention is concerned with new and useful ways of combining varying wavelengths of radiation to obtain desirable similarities in effect while utilizing desirable differences in effect, especially as applied to combining light-waves of varying lengths to produce desirable subjective similarities in visual effects simultaneously or in coordination with certain desirable subjective differences.

My invention contemplates the production of light of controlled predetermined spectral composition wherein two or more bright bands separated by a dark band replace in effect a continuous portion of an ordinary spectral composition.

The invention is concerned with the production of light of two or more objectively different spectral compositions which cause substantially the same color sensation, or no color sensation, and the coordination of such spectral compositions in various useful ways. The difference in spectral composition may be partial or complete as desired. The invention is specifically concerned with the production and use of light of two or more objectively different spectral compositions which have substantially the same center of gravity, affect the eye with the same color sensation, the same luminosity, and require the same ocular focus, or any or all these similarities as desired, and the coordination of such spectral compositions in various useful ways.

The general object of my invention as limited to visible light-waves is to diminish, intensify, conceal, reveal, or segregate desirable visible differences in visual effects such as scenes, images, pictures, displays and the like, which differences may be of form, color, or brightness, and at the same time prevent undesirable concomittant subjective differences, appearances, or effects, by producing the desirable visible differences respectively in or by light having the required subjective similarities together with an invisible spectral difference, the desirable visible differences being affected as desired by limiting the light admitted to the observer's eye respectively, to that of the spectral composition in which the chosen desirable visible different effect is produced.

Another object of my invention is the coordinated projection of light of two or more compositions which have an invisible spectral difference, substantially a common spectral center of gravity, and affect the eye with the same color sensation, the same luminosity, and require the same focus, or any or all of these.

Another object of my invention is the creation of images, shadows, scenes, or the like upon an object, surface, screen, photographic plate, the retina, or the like, or aerially, which objects are not colored with a color or colors having invisible spectral differences, by projecting thereon light having a predetermined composition involving invisible spectral differences, especially a spectral difference with a common center of gravity, a common luminosity, and a similarity in required ocular focus in addition to a common color effect. The images, scenes or the like thus created may have subjective color or not as desired.

Another object of my invention is to change a scene or the like which has not previously been specially colored with pigments or dyes having an invisible spectral difference but exists merely as a projected image having certain invisible spectral differences, to reveal or conceal such scene or image, or part of it, to separate, segregate, concentrate, accentuate, or improve such image, or part, or remove defects which are injurious or disagreeable to the eye, by creating the desired differences in light having an invisible spectral difference, but the same spectral center of gravity, required focus, luminosity, and similar desirable similarities.

Another object of the invention is the utilization of light having little or no subjective color to produce on a single screen or surface still or moving stereoscopic effects actually in black and white, and free from ocular strain, color bombardment or objectionable appearances by utilizing two substantially white beams of light having certain desirable similarities in luminosity and required focus together with an invisible spectral difference and confining to each eye its proper beam by means of subjectively similar but objectively differing light filters.

The stereoscopic effect may be produced by projection or permanently in pigments or the like.

Another object of my invention is the utilization of light having but one subjective color to produce still or moving stereoscopic effects actually in one selected color, and free from ocular strain or objectionable appearances by projecting two beams of light of substantially the same color but having an invisible spectral difference and confining to each eye its proper beam by means of subjectively similar but objectively differing light filters.

Another object of my invention is the similar production of still or more especially moving stereoscopic effects in full natural or other colors without ocular strain, color bombardment or objectionable appearances by the utilization of singly or in any desirable simultaneous or alternating stereoscopic coupling or combination, the bright band spectral components of two physiological whites having desirable similarities in luminosity and required focus together with partial or substantially complete invisible spectral differences for the projection of the original object, scene, or the like, on the sensitive film in photographing, for the projection on the screen, or the like, and for the transmissions of selective viewing filters. Permanent objective effects such as book illustrations are similarly produced by incorporating the initial selective filters in the pigments or the like in which the stereoscopic effect is built.

Another object of my invention is the production within a stereoscopic effect of a second stereoscopic effect which may have a different origin, and be on a different scale or taken with a different base line, or have a different total relief, and appear in the same color or a different color or colors from the principal stereoscopic effect, or have no sensible color, by utilizing for projection light involving two pairs of spectral compositions such that each spectral component of any one member of either pair is lacking in the spectral composition of the other member of the pair, and is lacking wholly or partly, as desired, in the composition of either member of the other pair, and utilizing before each eye respectively a viewing filter which transmits light only of the combined spectral compositions of one proper member of each of the two pairs of spectral compositions involved in the original projection.

Another object of my invention is the production of motion effects in natural or other colors without ocular discomfort, color bombardment, or disagreeable appearances by utilization of the bright band spectral components of two physiological whites having an invisible spectral difference in such manner in alternation or coupling that in representing an ordinary white effect all components of a physiological white are present on the screen substantially at the same moment.

Another object of the invention is the production of two black and white still or motion effects, or a combination of still and motion effects on one screen at the same time, to which objectively differing viewing filters are respectively the keys, similarly to conceal within a scene an effect visible only to an observer possessed of the filter key, by utilization of two lights having complete or partial invisible spectral differences and of a viewing filter or filters which transmit respectively only the light having the spectral composition in which the desired effect is presented. Similarly for effects in a single selected color, or two desirable colors.

Another object of the invention is, while illuminating a scene, objects, screen or the like from opposite directions by the projection of two separate beams of light, to reveal the scene from opposing viewpoints respectively as illuminated by subjectively white light, or by light subjectively of the same certain selected color, at the same time preventing all, or an undesirable proportion or part of the light composing or originating one beam of light reaching the eye of an observer choosing to utilize the other, this useful effect being accomplished by projection of two beams having an invisible spectral difference and interposing between the scene and the observer's eye a light filter transmitting light only of the beam the observer chooses to utilize.

Another object of my invention is the production, within the various effects producible by projection of light involving an invisible spectral difference, a desirable common chromatic effect, such as visibility of red to opposing automobile drivers, constancy of a selected color under an illumination having an alternating invisible spectral difference, intensification or selective use of a selected color in stereoscopic projection, and the like, by the utilization of light having a spectral similarity in addition to the necessary invisible difference, or by the utilization of light having an invisible spectral difference obtained by such respective spectral compositions that a sufficient and proper portion of one or more bright spectral bands of each spectral composition falls within the spectrum of the desired common color to alone assure its subjective appearance.

Another object of my invention is the intensification, or increase in saturation or chroma, or the contrary, of a subjective color or colors already objectively possessed by an object, surface, scene, or light, or of a selected color, while apparently utilizing ordinary white or substantially white light having a continuous, unbroken spectrum, by the utilization of light objectively different from ordinary white light, but which is subjectively similar to it, and at the same time causes the desired difference from the color effect obtainable from ordinary white light.

Another object of my invention is the intensification, or the contrary, of a subjective color or colors, or of a selected color, while apparently utilizing ordinary colored light having a continuous unbroken spectrum, or of customary spectral composition, by the utilization of colored light having an invisible spectral difference from ordinary light of the same color, but the spectral composition of which causes the desired unusual color effect.

Another object of the invention is the utilization of light having little or no subjective color, or a single selected color, to illuminate or apparently illuminate objects, scenes, images, surfaces, or the like already possessing objectively some subjective color or colors, for the purpose of causing certain or all of the colors possessed by the object to alter in saturation, brightness or hue, or to appear or disappear without apparent change in color or brightness of the illumination by restricting the illumination in succession to light having an invisible spectral difference together with spectral distributions suitable to assure the desired effects.

Another object of my invention is the utilization of light having little or no subjective color, or a selected subjective color to illuminate objects, scenes, images, surfaces or the like, which are already colored wholly or in part with colors having an invisible spectral difference, and without apparent change in the illumination cause a change in hue, brightness or saturation of all or part of a scene, or cause certain effects to appear or disappear by alternate utilization of light having an invisible spectral difference and a common center of gravity together with a spectral distribution suitable to assure the desired effect.

Another object is to illuminate with subjectively white light, or light of a single certain color, two or more objects or portions of a scene or the like already having a visible difference in color or brightness or both, and without apparently changing the illumination to change the color or brightness of one or both objects so as to produce a different visible difference.

Another object of the invention is the utilization of light of two or more colors to illuminate objects, scenes, images, surfaces or the like which are already colored wholly or in part with colors having or not having invisible spectral differences, and while visibly alternating the color of the illumination, to obtain changes in the hue chroma or brightness of the objects which are different from the effects obtainable with ordinary light of subjectively similar colors, by utilizing colored light having an invisible spectral difference from ordinary light of the same subjective colors.

Another object of the invention is secret signalling in white light, the signal being as desired either a darkening or disappearance of the light or appearance of hue, which is visible only to an observer with the key filter, this being done by projecting the signal in light having an invisible spectral difference and viewing through a suitable filter. The darkening or disappearance signal can also be done in colored light.

Another object of the invention is to test color blindness rapidly and surely by requiring comparison of objects or illumination having an invisible spectral difference to a normal eye and vice versa.

In carrying out my inventions as above described, I contemplate the production of light of definite predetermined wavelengths and energy distribution by any suitable method, such as by selection of a light source giving of itself the desired bright line or band spectrum, or by utilizing any suitable light source of continuous spectrum and actually forming its spectrum and after blocking out the undesired wavelengths recombining the light, or by utilization of a selective filter or filters in cooperation with a suitable light source. Such a filter may be selectively transmitting or selectively reflecting, and an object or scene or part thereof may itself serve as the filter. Likewise an object or scene may be in effect the light source.

I further contemplate in carrying out my invention the utilization of selectively transmitting or reflecting filters for the revelation of the desirable subjective differences in effect of the two coordinated spectral compositions, and, where desirable, to use an illuminated object or part of a scene as the filter. Any filter may be compounded of two or more cooperative or coordinated units.

I have illustrated in the drawings certain diagrams as an aid to a better understanding of my invention, in which.

Figure 1:
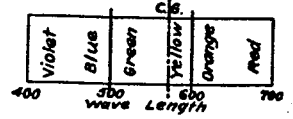
Figure 1 is a diagram of the visible continuous spectrum of ordinary white light, the position and wavelengths of the six principal colors being indicated. The spectral center of gravity is at CG.
Figure 8:
Fig. 8 and Fig. 10 show the spectrums of two physiological whites having an invisible complete spectral difference. The center of gravity of each spectrum is at CG.
Figure 10:
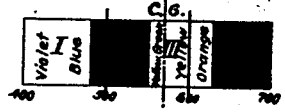
Figure 12:
Figure 14:
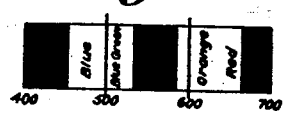

An invisible partial spectral difference is shown by pairing Figs. 8 or 10 with Figs. 1, 12 or 14.

Fig. 12 and Fig. 14 show another pair of physiological whites having an invisible complete spectral difference, but a common chromatic effect in red.

Figure 9:
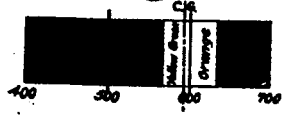
Figure 11:
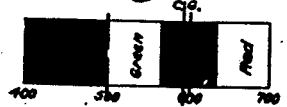

Fig. 9 and Fig. 11 show the spectrums of two physiological yellows with an invisible complete spectral difference. The center of gravity of each spectrum is at CG.

Figure 13:
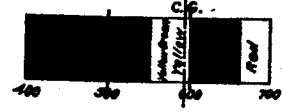
Figure 15:
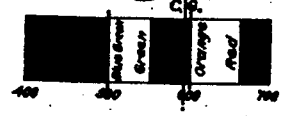

Fig. 13 and Fig. 15 show the spectrums of another pair of physiological yellows having an invisible spectral difference. The center of gravity of each spectrum is at CG.

Figure 16:
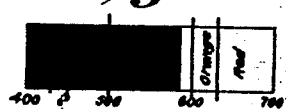

Fig. 16 shows the continuous spectrum of ordinary physiological red, any part from 630 millimicrons to 700 mm. being spectral red.

Figure 17:
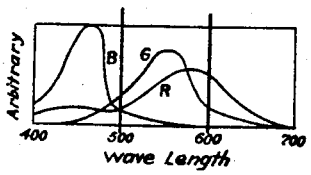

Fig. 17 is a diagrammatic graph showing the relative effect on the different color sensations by rays of different wavelength. The blue, green and red curves are indicated respectively by B, G, and R.

Figure 18:
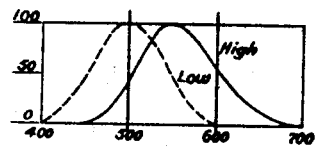

Fig. 18 is a diagrammatic graph showing the relative luminosity of different wavelengths at the same energy. The continuous line applied for high luminosities, the broken line for low luminosities.

Figure 19:
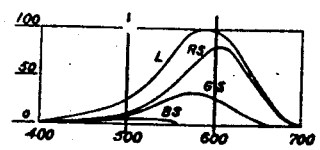

Fig. 19 is a diagrammatic graph showing the red, blue and green sensation curves in terms of luminosity.

Figure 20:
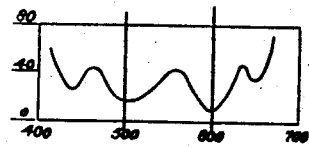

Fig. 20 is a diagrammatic graph showing the wavelength increments necessary for discrimination of hue difference of spectral colors. Abscissas are wavelengths, ordinates are wavelength changes required to cause hue difference.

Figure 21:
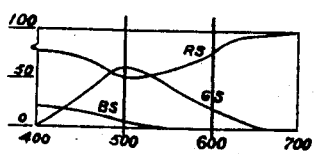

Fig. 21 is a diagrammatic graph showing the per cent of red, green and blue sensations in spectral colors in terms of luminosity.

Figure 22:
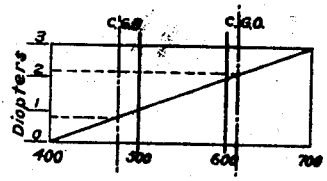

Fig. 22 is a diagrammatic graph showing the difference in ocular focus required for different spectral colors. The spectral center of gravity of blue of Fig. 25, and orange of Fig. 26, are shown respectively by CGB and CGO.

Figure 23:
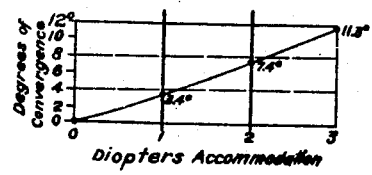

Fig. 23 is a diagrammatic graph showing the change in convergence of the eyes normally to be expected from changes in required focus, assuming no convergence required at relaxed accommodation.

Figure 24:
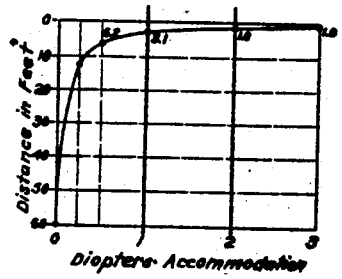

Fig. 24 is a diagrammatic graph showing the focus, or accommodation normally required and associated with various distances.

Figure 25:
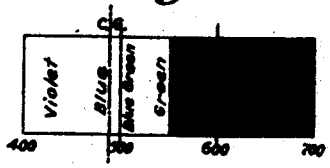
Figure 26:
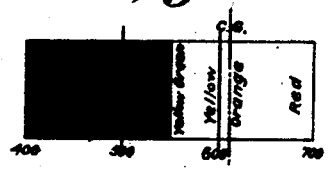

Fig. 25 is a diagrammatic spectrum representing the composition of ordinary blue. CG shows the center of gravity of the composition.

Fig. 26 shows the composition of ordinary orange, and its center of gravity at CG.

Figure 27:
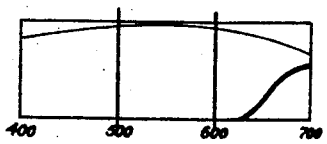

Fig. 27 shows diagrammatic spectrophotometric curves of the spectral compositions of two illuminants, the light line representing daylight, the heavy line a red light differing from daylight in hue, luminosity, center of gravity, and required focus.

Figure 28:
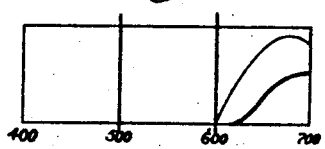

Fig. 28 shows the spectral compositions of two red illuminants, indicated by the light and heavy line respectively, which have the same subjective hue, but differ in luminosity, center of gravity and required focus.

Figure 29:
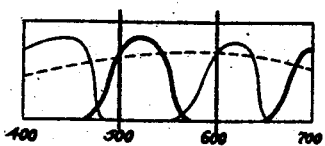

Fig. 29 shows the spectral compositions of three illuminants each of which appears white to an observer, and has substantially the same luminosity, center of gravity and required focus, a light broken line representing daylight, a light unbroken line and a heavy line indicating respectively two compositions consisting each of two bright bands separated by a dark band.

Figure 30:
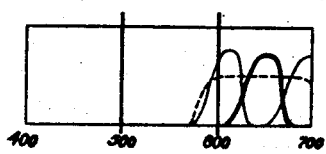

Fig. 30 shows the spectral composition of three red illuminants which have the same subjective hue, center of gravity, required focus, and luminosity.

Figure 31:
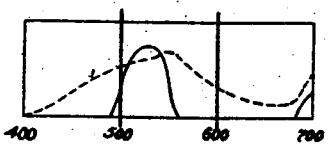

Fig. 31 shows by a light broken line the spectral composition reflected by an ordinary green object when illuminated by daylight, and by a heavy line the composition resulting from illumination by light of the composition shown by the heavy line in Fig. 29.

Figure 32:
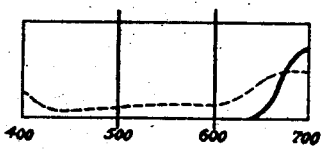

Fig. 32 shows the spectral composition reflected from an ordinary red object when illuminated by light of same compositions as used in illuminating Fig. 31.

Figure 33:
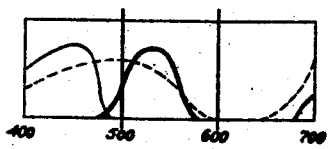

Fig. 33 shows the three different spectral compositions of light reflected by the same suitably colored object when illuminated respectively by each of the illuminants shown in Fig. 29, using corresponding line symbols.

Figure 34:
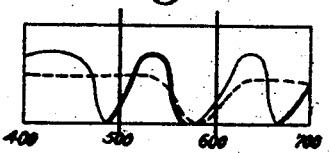

Fig. 34 shows three different spectral compositions reflected by a suitably colored object when illuminated respectively by each of the illuminants shown in Fig. 29, using corresponding line symbols.

Figure 35:
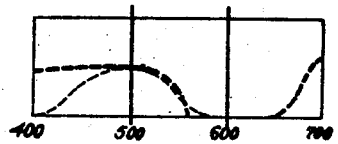

Fig. 35 shows two spectral compositions having an invisible spectral difference under one of the three illuminations shown in Fig. 29, a visible difference under either of the other two, and under one of these two illuminants a visible difference of each from either as seen under either other illumination.

It is well known that ordinary white light is a mixture of light waves of nearly equal energy of all wavelengths between about 400 and 700 millimicrons, that ordinary colored light is a similar mixture except that the energy distribution is unbalanced, and that by suitable use of a prism or diffraction grating either mixture can be spread out into a streak of varicolored light known as the visible spectrum wherein light is positioned progressively according to its wavelength, each wavelength appearing of a different hue from any other except as limited by an observer's ability to distinguish small differences in hue. Such a spectrum, with the position of the six principal hues indicated, is shown in Fig. 1.

Figure 2:
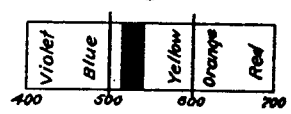
Fig. 2 shows the spectrum of a light from which the spectral green rays are absent.
Figure 3:
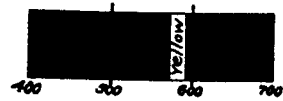
Fig. 3 shows the spectrum of a light composed of substantially spectral yellow rays only.
Figure 4:
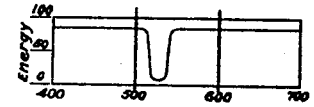
Fig. 4 is a diagrammatic energy graph of the spectrum shown in Fig. 2.
Figure 5:
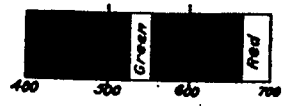
Fig. 5 shows the spectrum of a physiological yellow light which appears to an observer identical with the light composed of spectral yellow shown in Fig. 3.
Figure 6:
Fig. 6 shows the spectrum of a light which appears white to an observer, i. e. is a physiological white. The spectral center of gravity is at CG.
Figure 7:
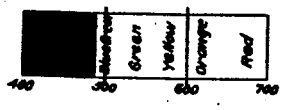
Fig. 7 shows the continuous spectrum of ordinary physiological yellow light, such as is reflected by ordinary yellow dyes, pigments, and the like in daylight or substantially as given by a tallow candle, but which appears to an observer identical with the yellows shown in Figs. 3 and 5 respectively.

If waves of certain lengths are not present in the light being examined, their position in the spectrum receives no light, resulting in a dark band or bands in the spectrum as shown in Figs. 2 and 3; likewise an excess or deficiency of energy at certain wavelengths results in a corresponding excess or deficiency in brightness at the part of the spectrum formed by those wavelengths. The relative or the actual energy at each wavelength in the spectrum of a given light may be measured on a spectrophotometer and recorded qualitatively and quantitatively as shown in Fig. 4, hence this spectral composition of a light exists objectively as a definite relation between energy and wavelength independently of its effect upon an observer, and objectively completely describes and determines the light.

Thus objective identity of lights connotes identity of their spectral compositions. On the other hand, subjective identity of lights does not connote identity or even similarity of spectral composition; lights which are objectively very different, that is, have a partly or entirely different spectral composition, may appear identical to an observer. In other words, such lights have an invisible special difference. Such subjective identities with an invisible spectral difference are shown in Figs. 1, 6, 8, 10, 12 and 14, each of which affects an observer as white; while Figs. 3, 5, 7, 9, 11, 13 and 15, each affects an observer as yellow.

This subjective identity of objectively different light, according to the trichromatic theory of color vision, is the result of the fact that the human eye sees all color by means of but three fundamental physiological sensations, namely, red, green and blue, the approximately 200 different detectable hues being the physiological interpretation of differing proportions of these three sensations. Each of the three sensations is stimulated by any of different wavelengths comprising a large part of the spectrum, also, a single wavelength may affect two or all three fundamental sensations. The extent of the former effect and the proportional value of the latter are shown in the well known red, green and blue sensation graph Fig. 17.

Owing to this simple color basis, color vision is not analytic but responds to any stimulus, however complex, by a single simple color sensation. Any stimulus which affects the three fundamental sensations in a given proportion and intensity causes the same color sensation regardless of the actual wavelengths involved in the stimulus.

Since several different wavelengths stimulate a given color sensation, that sensation is affected with the same intensity by light having its total luminosity divided among many such wavelengths as by light having the same total luminosity confined to one wavelength. That is, a narrow spectral band of high luminosity will replace or balance in a spectral composition a broader band of lower intrinsic spectral luminosity. Luminosity or brightness being subjective does not vary directly as the energy in a given wavelength, and further, the same energy utilized at different wavelengths results in different luminosities, as shown in the well known luminosity curve Fig. 18. In determining what sensation will result from a certain spectral composition each part of the spectrum has a certain weight according to its energy position relative to the luminosity curve and relative to the red, green and blue sensation graph, etc., so that the spectral position which divides the total utilized weights equally may be called the center of gravity of the weights or of the spectral composition.

In general, although a common spectral center of gravity does not connote a sameness or even similarity of physiological color, many different spectral compositions resulting in the same physiological color can have the same spectral center of gravity and all spectral compositions resulting in white have substantially a common center of gravity. Physiological color reactions, especially of the type utilized in my invention, are endlessly complex if brought into impracticable refinement, hence this simple idea of center of gravity as outlined is utilized as being within the meaning and application of my invention, substantially true and highly descriptive.

Special center of gravity is important for the reason that from certain standpoints it determines and indicates the effect of the whole spectral composition, as for example, in the case of ocular focus. In a mixture of wave-lengths as in physiological color the eye will focus at the spectral positions occupied by the center of gravity, see Fig. 22.

In this application the subjective colors seen in the spectrum are referred to as "spectral colors", and those subjective colors resulting from a mixture of two or more spectral colors as "physiological colors".

Of importance to application of my invention are the facts that a physiological color may be matched by physiological color of several entirely, or if desired, partly different spectral compositions; that the continuous bright spectral band or bands of ordinary light or color can be replaced by two or more suitably chosen narrower bands separated by a dark band without altering the color of the light; and that two compositions of the latter type may be produced in which the bright bands of one occur in the spectral position occupied by the dark bands of the other, i. e., alternate in the two spectra.

Obviously this manner of division of spectral composition makes it possible to design two or more spectral compositions having a common center of gravity, or an equal distribution relative to respective color sensation curves, or to the luminosity curve, or, in general, relative to curves such as shown in Figs. 17 to 23 inclusive or the like, or to a desirable compromise between several effects. It is of peculiar importance to certain applications of my invention that in certain cases two or more spectral compositions can be designed which have at the same time a common color effect, a common effect in luminosity, and a common effect in ocular focus and other desirable effects.

I will now explain my invention in detail by some examples showing its utility and novelty.

One application of my invention is to that visual effect in which perception of stereoscopic relief is obtained.

It is well known that when two pictures of the same scene or object taken or constructed as if taken from different view points or silhouettes by two separated light sources are viewed at the same time, each by one eye from which the other picture is hidden, the objects in the scene appear solid or to have a depth or third dimension. When these two pictures are superimposed upon the same screen area, as they must be to be shown in either stereoscopic still or cinematographic pictures, or to be viewed in a book or the like at normal near reading distance without aid of prism or lens, a well known method of differentiating the pictures to the individual eyes is to project the pictures through color filters of complementary colors such as red and green, orange and blue, or of colors still more widely separated spectrally such as red and blue, or produce the pictures objectively in pigment or dye of these colors, the superimposed pictures being viewed through light filters transmitting respectively only similar complementary colors, so that each eye sees only the picture intended for it.

Spectra representing such filters are shown in Fig. 25 and Fig. 26, the former representing the spectral composition of the light admitted to one eye, the latter, the spectral composition admitted to the other.

In such practice, however, the following serious defects are present which my invention overcomes.

The eye not being achromatic must focus differently for each color. With such widely separated centers of gravity as exist in the spectra of Fig. 25 and Fig. 26 having a focus difference shown in Fig. 22, either a harmful muscular struggle ensues, or else the brightest color wins, leaving the other image far out of focus and obscure. In either case serious eye strain and headache follows prolonged observation. This is true both as to still and moving stereo projection, and to printed effects. By using two physiological whites or grays having invisible spectral differerences such as is illustrated in the spectra of Fig. 8 and Fig. 10, or the less desirable yellows, Fig. 13 and Fig. 15, no difference of focus is required for the two eyes which now focus on the same center of gravity.

The lines of sight of the two eyes converge a different amount in looking at objects at different distances as shown in Fig. 24, and below a certain limit the ocular focus also changes. Thus a subconscious coordinated relation between convergence and focus has been developed as shown in Fig. 23 with the result that if the required focus is changed, the eyes automatically change convergence, or if the eyes have each a different required focus there will be a struggle between two convergences. Since only a certain convergence will give stereoscopic fusion at a given stereoscopic distance a change of convergence no sooner starts than "doubling" results and the stereoscopic reflex works against the convergence reflex, the resulting psychological and physiological strain causing intense discomfort. By using the light of my invention the same focus is required all the time and for each eye, and this harmful strain is avoided.

In still or moving stereo projection or in a printed picture, when a scene is so presented to each eye in definitely different highly saturated hues, a psychological struggle occurs, the scene appearing for a while in one of the colors, in the next moment in the other, and occasionally the colors blend. This tendency even if masked by the dominance of the brighter or the preferred of the colors is disagreeable. By using the light of my invention this difficulty is dispensed with as the same physiological color is presented to each eye.

In the usual method of still or moving stereo projection or presentation of printed pictures, psychological interpretation of two such colors from the same objects in the scene, causes a peculiar, unnatural iridescence in parts of the scene. By the use of two beams of light of the same physiological color this disagreeable result is obviously avoided.

Two complementary colors as ordinarily used do not have equal apparent luminosity, even if of the same actual luminosity, for the reason that psychologically a scene appears brighter in a "warm" color than in a "cool" color. An unsatisfactory brightness unbalance results. Where both beams are white or yellow or some other hue as contemplated by this invention, psychological reaction to color need not be considered.

Because of the nature of stereoscopic vision, parts of the scene at stereoscopic distances other than that of the part of the scene which is at the moment fused stereoscopically are separated or "doubled". Such portions appear sharply in one or other of the contrasting colors used. In my invention no contrasting colors are used and hence this objection cannot occur.

It is well known that the achromatism of projection lenses is not perfect so that colors of widely separated centers of gravity require a different focus or give images of unequal size or both. The use of beams having the same spectral center of gravity obviates this.

In cinematographic stereo projection, "color bombardment" occurs, due to the difference in sensitiveness of the eye to flicker in different colors, rapid alternation of two strong colors, interruption of the natural color struggle between the eyes, and an intensified effect of the difference in required focus for each eye. All these individually and collectively cause the undesirable color bombardment, which is obviously not present when no contrasting colors are used.

There is also present in moving stereo pictures a flickering trail of alternating complementary colors following the edge of any rapidly moving part of the scene. If this is to be avoided while using contrasting colors, the choice of subjects is decidedly limited. Obviously, the avoidance of contrasting colors eliminates this serious defect.

All these defects in superposed stereoscopy are the result of undesirable dissimilarities in visual effect, which the coordinated spectral compositions of my invention replace by desirable similarities, at the same time maintaining the objective dissimilarity which permits suitable segregation of desirable differences in scenic or pictorial structure, such as give the stereoscopic effect.

A similar coordination of the spectral composition utilized for black and white effects can be applied to the production of stereoscopic effects in full colors, the same desired similarities in focus, color and luminosity, and the desired stereoscopic dissimilarity being obtained. Colored stereoscopy has hitherto been attempted by utilization of the two color process, one of these colors being confined to one eye, the other, essentially complementary to the first, to the other eye. The defects in this practice are so extensive that satisfactory superposed stereoscopy in colors has been considered impracticable.

As an example of my invention I may take the spectral compositions represented in Fig. 8 and Fig. 10 and coordinate them as follows. For the left eye, pictures are taken alternately through filters, one transmitting the component I of the spectrum of Fig. 10, the other filter transmitting component III of the spectrum of Fig. 10. For the right eye, pictures are alternated through filters, one transmitting the component II of Fig. 8, the other the component IV of Fig. 8. From the two view points, the pictures through the filters transmitting components I of Fig. 10 and II of Fig. 8 are taken simultaneously, alternated with simultaneous pictures from the two view points through the filters transmitting component III of Fig. 10 and IV of Fig. 8 respectively. These components of the picture are then projected in like manner through like filters onto the screen, and due to the invisible spectral differences to the two beams of light, when the screen is viewed through filter Fig. 10 with the left eye and filter Fig. 8 with the right eye, each filter being substantially colorless or neutral gray, each eye sees its own picture and the stereoscopic effect results in full natural colors. Suitable filter corrections for film sensitiveness to color in taking and for the spectral composition of the light source used in projection are easily made where desirable and necessary speed in taking be gotten by specially color sensitized films for each component. No apparatus is required other than two units of the usual taking and projecting equipment such as is used for two color projections. The film can be stained to act as filters in projection, if desired, or the recently developed double emulsions or double coated film can be used and all alternation on the screen avoided. This manner of coordinating two physiological whites has the effect of presenting to each eye a two color process capable of showing all colors, and the same focus is required of each eye, and the same luminosity presented, hence no ocular strain or undesirable appearances result. Obviously other combinations of the same components can be used to accentuate other qualities.

The above example may also be applied to still stereoscopic projection. A simple variation of the above is the application of the same method to produce permanent objective pictures and effects or book and similar illustrations in stereoscopic form and full colors by segregating the illuminating light into two objectively different beams by selectively reflecting filters consisting of suitable pigments, inks or dyes in which the effect is permanently created.

The application of my invention to reduce headlight glare from automobiles and the like is of great utility, since drivers from opposite directions can utilize light of the same most desirable character. Desirable subjective similarities, such for example, as exists between the two physiological whites shown in Fig. 12 and Fig. 14 make this feasible and at the same time assures to each driver good visibility of red rear lights, while making possible the desirable opposition in direction. Ordinarily complementary colors have hitherto been used which are disagreeable and harmful, and one of which blocks off red.

Many other applications of the production and coordination of predetermined spectral compositions, one at least of which consists of an abnormal number of bright bands separated by an appreciable dark band, and which have an invisible spectral difference, therefore, the same physiological color, but may have also the same luminosity and center of gravity, may be found useful in the arts.

Such a beam may be used to great advantage in the advertising, the theatrical field, or in illumination engineering particularly where it is desirable to intensify certain colors in a picture, sign, scene or other object already objectively colored. Ordinarily this has been attempted by making use of light having visible color, and of an ordinary spectral composition. The results of such practice are poor, and also are what are recognized as normal color reactions. By the use, however, of light of the composition shown by the heavy line in Fig. 29, for example, a green object having, when illuminated by ordinary white light, the unsaturated green color shown in Fig. 31, broken line, is made to appear a brilliant highly saturated green of spectral composition shown in Fig. 31, heavy line, although the illuminating light still appears white. Similarly for a red object as shown in Fig. 32, this intensification resulting from two causes, the purification of the desired color by spectral limitation, and intensification by simultaneous contrast with the general scene by limiting all color to the desired color and its approximate complement. Further, red and green objects can be intensified simultaneously by the same objective light. Like effects can be obtained in other colors, and other color reactions also be utilized.

Obviously too, an object of well known hue can be made a different unusual hue while still apparently illuminated by ordinary white light. A similar action by colored light can be obtained utilizing compositions such as are shown for red in Fig. 30.

In the above cases the desirable subjective similarity is of the illumination to ordinary white or colored illumination, and the desired subjective difference is the altered saturation, hue or brightness from that normally to be expected. The result is the same whether the illuminant is restricted before or after reflection by the object.

A valuable special application of the above effects for the purpose of increasing visibility or differentiations of objects, or both, in a complicated scene is to increase the apparent luminosity or color saturation, or both, of an object or objects in a scene while retaining similarities to ordinary illumination in certain other parts of the scene, notably in application to improving visibility and differentiation of the light from flame, arc or spark spectra when observed in a scene in which other visibilities are also desired. By restricting the light reaching the eye to suitable parts or lines of the spectrum or spectra it is desired to intensify and spectral colors substantially complementary to these parts, and such further parts of the visible spectrum necessary or desirable to balance the total restriction to a composition giving physiological white, the subjective brightness and color saturation of the objects, flames or the like will be much increased while white objects will appear substantially white, and ordinary color reactions not materially disturbed. This application is of special military and naval use as applied to tracers, for example, especially where such filter can be made to do double duty in special applications and as ordinary neutral filter to reduce glare.

It has been proposed heretofore to make use of changing color of the illumination of compositions similar to Fig. 25 and Fig. 26, or of using two illuminants having a socalled invisible spectral difference such as shown in Fig. 28 to change the hue or brightness of a colored object. In both cases the change in the illuminating light is so noticeable either from change of hue, or of brightness, as to spoil the effect desired, as it is well known that a color can be changed by changing its illumination, Further, even in differences of center of gravity such as in Fig. 28, a change of focus is necessary and causes a physiological sense of change.

By light of my invention I can change the color of an object alternately without apparently changing the hue or brightness of the illumination or requiring a change of focus. A comparison of Fig. 30 with Fig. 28 will make this clear. More important, by alternation of the two illuminations of Fig. 29 the unbroken lines, I can alternate an object color which is pure blue under ordinary white light from violet-blue to pure green while illuminating the object with white light of unchanging appearance either of color or brightness. These are adjacent colors, the method being shown in Fig. 33. I can likewise obtain opposite colors as shown in Fig. 34 wherein an ordinary pale magenta is made alternately green and purple by unchanging white illumination. The desirable similarity in focus, hue and brightness and desirable dissimilarity in effect are both obvious; also that innumerable desirable theatrical, illumination or advertising color effects can be obtained.

Changing the illumination to reveal a color difference between objects or parts of a scene previously objectively specially colored with pigments, dyes and the like having an invisible spectral difference has been done by illuminants having spectral compositions such as are shown in Fig. 27 and Fig. 28. The former pair are different in hue, center of gravity and brightness. The latter pair have a subjective similarity in hue, but a distinct difference in brightness and center of gravity. This method has been further limited by having been comprehended and applied only in revealing color or brightness at the ends of the spectrum previously concealed by the greater luminosity of the central portion as shown by the luminosity curve, Fig. 18.

My invention is entirely different. By using light of my invention, as shown in Fig. 30, for example, I can obtain three useful illuminations having the same hue, brightness and center of gravity, two having an objective complete difference, the other having an objective partial difference. These are all desirable similarities. Desirable differences in effect are evidently easy to produce.

My invention permits a still more valuable application in obtaining similar effects by white illumination. For example, by utilizing the spectral compositions of the three illuminants shown in Fig. 29 on two objects having the spectral reflections shown in Fig. 35, the two objects appear (1) both as blue, (2) one violet, the other blue, (3) one bluishgreen, the other white. In all cases, the spectral center of gravity, the absence of color, the luminosity and required focus is the same, but desirable differences in effect are obtained.

Also, involved in the above is the important fact that by my invention I can with a constant subjectively white illumination change colors having a visible difference to other colors having a visible difference.

In carrying out my invention as above described, I contemplate the production of light of definite predetermined wavelengths and energy distribution such for instance as is illustrated in Figs. 5, 6, 8, 9, 10, 11, 12, 13, 14 and 15, and Figs. 29 and 30, by any suitable method, such as by selection of a light source giving of itself the desired bright line or band spectrum, or by utilizing any suitable light source of continuous spectrum and actually forming its spectrum and after blocking out the undesired wavelengths recombining the light, or by utilization of a selective filter or filters in cooperation with a suitable light source. Such a filter may be selectively transmitting or selectively reflecting, and an object or scene or part thereof may itself serve as the filter. Likewise an object or scene may be in effect the light source.

I further contemplate in carrying out my invention the utilization of selectively transmitting or reflecting filters for the revelation of the desirable subjective differences in effect of the two coordinated spectral compositions, and, where desirable, to use an illuminated object or part of a scene as the filter. Any filter may be compounded of two or more cooperative or coordinated units.

I intend to utilize any suitable selectively transmitting or reflecting material for the above filters, necessary or desirable, either transparent, translucent or opaque, such as colored or flashed glass, stained or dyed gelatine or collodion or the like, supported or unsupported by a transparent backing such as glass, mica, celluloid or the like, thin films of transparent pigments or dyes, liquid chemicals or solutions of inorganic or organic materials in cells, surfaces specially covered with thin or thick layers of pigments, dyes, lakes, inks or the like or natural objects and surfaces.

However, I have found that the class of coal tar dyes are peculiarly suitable for the making of transparent filters when used as a stain for gelatine, collodion or the like or in solution and also for the formation of reflecting filters, the dye being used either as stain or in the form of lakes. Such dyes enable one skilled in the art to prepare filters limiting light to any desired spectral composition both as to wavelength and to difference in relative energy at different wavelengths, and with the minimum loss of light with the utmost precision, and permit delicate correction for light source, photographic sensitivity and the like.

Obviously a separate unit can be used for each dye if desired.

In certain cases, especially where single components of a composition are utilized separately I find that colored glass units may be utilized with advantage, singly or in combination. Glass charged with neodymium or a similar element are peculiarly useful, alone or in combination with other filters, for some purposes. In other cases it is advantageous to have the invisible complete spectral difference in the light sources.

In the claims where I use the word "scene" I mean any picture, photograph, plan, diagram, shadow, silhouette, print, engraving, object or image or assembly of objects or images.

Where I use the word "projection" I mean to include what is well known in the arts as opaque or solid projection, obviously ordinary photography involves opaque projection, as does ordinary vision wherein objects are projected on the retina. Further, I use projection to describe the control of direction of light radiation reserving the term illumination for use when I wish to include radiation uncontrolled in direction. Light radiating under the inverse square law is "projected" light if the size of the light source can be neglected in the manner the light source is utilized; for example, the outline of an object, silhouette, or a transparency, can be projected by simply placing said object or transparency in the path of light radiating from a relatively small source: i. e., projection is not confined to action of lens or reflector. Obviously many effects obtained by illumination can also be obtained by projection, and many effects of projection can also be obtained by illumination, but not all. It is evident that "projected" light must illuminate, hence in the claims "projection" includes "illumination" as well; likewise the term "illumination" in the claims may include illumination by projection where that connotation is effective in the procedure of the claim: therefore in the claims, "projection" and "illumination" may each include the other, the distinction in use being confined to the clarification of the procedure.

As shown above this element cooperating with the light source to produce light having the desired character may not actually filter, or such element may be a property of the light source itself, so that in the claims where I use the expression "character imparting element", I mean a filter acting either by selective transmission or selective reflection, or any device which will impart the desired character to the light.

Likewise the revealing filter does not necessarily include an actual filtering action, so that in the claims where I refer to a revealing filter I mean any means whereby the desirable subjective differences in effect of the two coordinated spectral compositions may be revealed whether by filtration or not.

By dark spectral bands I mean bands dark enough to cause the desired effect. This may require complete absence of light, or only a relative darkening compared to the bright bands.

Certain of the subject matter disclosed herein is claimed in divisional applications 433,098 and 433,099 filed March 4, 1930.

What I claim is:

1. The method of producing two coordinate differing visual effects which includes the steps of projecting upon an object objectively homogeneous as to color, a plurality of beams of subjectively similar light, said beams having an invisible spectral difference and substantially the same spectral center of gravity, said object having a spectral center of gravity different from that of the beams, whereby when either beam strikes the object, its subjective color will change.

2. The method of producing two coordinate differing visual effects which includes the steps of projecting upon an object objectively homogeneous as to color, a plurality of beams of subjectively similar light, said beams having an invisible spectral difference, the spectrum of each beam including a dark and a bright band, the dark band of one beam occupying substantially the position in the spectrum of the bright band of the other, said beams having the same spectral center of gravity, the spectral centers of gravity of the beams and the object being different, whereby when either beam strikes the object, its subjective color will change.

3. The method of producing two coordinated different visual effects which includes the steps of projecting an image by a beam of light, projecting another image by another beam of light, said beams being of subjectively similar light, said beams having an invisible spectral difference and substantially the same spectral center of gravity, introducing into the path of said beams an object objectively homogeneous as to color, whereby each beam will produce a visual effect, between which is a desirable subjective difference and a desirable subjective similarity, and segregating the said visual effects by introducing between the eye and the object a filter, a spectral transmission of which is substantially constant throughout its area, which filter restricts the light reaching the eye to wavelengths comprised in a chosen one of said visual effects.

4. The method of producing two coordinated different visual effects which includes the steps of projecting an image by a beam of light, projecting another image by another beam of light, said beams being of subjectively similar light, said beams having an invisible spectral difference and substantially the same spectral center of gravity, introducing into the path of said beams an object objectively homogeneous as to color, whereby each beam will produce a visual effect, between which is a desirable subjective difference and a desirable subjective similarity, and segregating the said visual effects by introducing between the eye and the object a filter, the spectral transmission of which is substantially constant throughout its area, and observing each effect with the same physiological ocular focus, and restricting by means of said filters, the light reaching the eye to wavelengths comprised in a chosen one of said visual effects.

5. The method of producing two coordinated different visual effects which includes the steps of projecting an image by a beam of light, projecting another image by another beam of light, said beams being of subjectively similar light, said beams having an invisible complete spectral difference and substantially the same spectral center of gravity, introducing into the path of said beams an object objectively homogeneous as to color, whereby each beam will produce a visual effect, between which is a desirable subjective difference and a desirable subjective similarity, and segregating the said visual effects by introducing between the eye and the object a filter, the spectral transmission of which is substantially constant throughout its area, which filter restricts the light reaching the eye to wavelengths comprised in a chosen one of said visual effects.

6. The method of producing a plurality of beams of subjectively similar light having an invisible substantially complete spectral difference, which includes the steps of subjecting each of two beams of light to the selective absorption of a different suitable filter, the filter applied to each beam having a selective transmission substantially spectrally non-inclusive of the spectral transmission of the filter for the other beam, the transmission of each of said filters having the same spectral center of gravity, the spectral transmission of each filter being substantially constant throughout its area.

7. The method of producing desirable light effects which includes the steps of cooperating with light a combined character imparting and character segregating element by subjecting said light to selective absorption by said element, after such cooperation said light having and including a plurality of pairs of directionally segregated predetermined coordinated differing spectral compositions, each of said pairs of coordinated composition including one composition consisting of a plurality of bright spectral bands separated by a dark band, the spectral position of which dark band is occupied by a bright band of the other composition of the pair, the light comprising the units of each pair having an invisible spectral difference, and the same center of gravity, cooperating said coordinated and segregated light with a revealing pair of homogeneous filters introduced between said combined element and the observer's eye, to reveal said segregation, in light of a plurality of colors, while maintaining the said desirable subjective similarities between the light of said segregated compositions.

8. The method of producing in a plurality of colors, a sensibly constant light effect having an alternating substantially invisible objective difference, which includes the step of providing two beams of light, temporarily cooperating each beam with a first character imparting element by introducing said element in said beam, such cooperation imparting to each beam a predetermined coordinate first spectral composition consisting of one bright band, the sum of said spectral compositions of the two beams being two bright spectral bands separated by a dark band, then temporarily replacing each of said first character imparting elements by a second character imparting element, cooperating each beam temporarily with said second character imparting element, such cooperation imparting to each beam a second spectral composition, said second spectral composition of each beam having likewise a predetermined coordinate spectral composition consisting of one bright band, the sum of said second spectral compositions being likewise two bright spectral bands separated by a dark band, the bright spectral bands of the said sum of said second coordinated compositions occupying the spectral position of the dark bands of the said sum of said first spectral compositions, continuing alternately with said first and second character imparting elements so as to impart to the sum of said two beams an invisible alternating spectral difference, the sum of said beams having a substantially constant hue, projecting said two beams, each of said alternating objective composition, upon a suitable screen, objectively undifferentiated as to color, to produce by said projection said constant light effect of varying spectral composition.

9. The method of producing subjectively similar light having an improved invisible spectral difference, which includes the steps of subjecting light having a known predetermined spectral composition to the action of a combined spectral character imparting and character segregating element, said character imparting and segregating element having and including a plurality of known predetermined differing wave length-selective, wave length-limiting, components, said components, being each coordinated in a predetermined manner with said predetermined spectral composition of said light, and with the spectral composition of each other, said components each transmitting substantially only certain known predetermined wave lengths of the said light, the selective transmission of each of said components for said light having substantially the same spectral center of gravity, and substantially the same hue, cooperating said light separately with the respective said selective limiting components of said combined spectral character imparting and character segregating element, whereby said light is given said segregated improved invisible spectral difference.

10. The method of producing subjectively similar light having an improved invisible spectral difference, which includes the steps of subjecting light having a known predetermined spectral composition to the action of a combined spectral character imparting and character segregating element, said character imparting and segregating element having and including a plurality of known predetermined differing wave length-selective, wave length-limiting, components, said components being each coordinated in a predetermined manner with said predetermined spectral composition of said light, and with the spectral composition of each other, said components each transmitting substantially only certain known predetermined wave lengths of the said light, the selective transmission of each of said components for said light having substantially the same spectral center of gravity, and substantially the same hue, being substantially exclusive of the selective transmission of each other said component, cooperating said light separately with the respective said selective limiting components of said combined spectral character imparting and character segregating element, whereby said light is given said segregated improved invisible spectral difference.

11. The method of producing subjectively similar light having an improved invisible spectral difference, which includes the steps of subjecting light having a known predetermined spectral composition to the action of a combined spectral character imparting and character segregating element, said character imparting and segregating element having and including a plurality of known predetermined differing wave length-selective, wave length-limiting, components, said components being each coordinated in a predetermined manner with said predetermined spectral composition of said light, and with the spectral composition of each other, said components each transmitting substantially only certain known predetermined wave lengths of the said light, the selective transmission of each of said components for said light having substantially the same spectral center of gravity, and substantially the same hue, the said selective transmission of each of said components for said light having a spectral composition including a plurality of bright spectral bands separated by a dark band, the said bright spectral bands of each composition occupying substantially a spectral position included only in dark bands of the other compositions, cooperating said light separately with the respective said selective limiting components of said combined spectral character imparting and character segregating element, whereby said light is given said segregated improved invisible spectral difference.

12. The method of producing subjectively similar light having an improved invisible spectral difference, which includes the steps of subjecting light having a known predetermined spectral composition to the action of a combined spectral character imparting and character segregating element, said character imparting and segregating element having and including a plurality of known predetermined differing wave length-selective, wave length-limiting, components, said components being each coordinated in a predetermined manner with said predetermined spectral composition of said light, and with the spectral composition of each other, said components each transmitting substantially only certain known predetermined wave lengths of the said light, the selective transmission of each of said components for said light having substantially the same spectral center of gravity, and substantially the same hue, the said selective transmissions of each of said components for said light having a spectral composition including a plurality of bright spectral bands separated by a dark band, the said bright spectral bands of each composition occupying substantially a spectral position included in dark bands of the other compositions, and in addition, a predetermined portion of the spectral position included by the bright bands of each of the other compositions, the light of each of these said portions having a certain selected substantially common subjective color, so as to produce a secondary chromatic effect common to all said selective transmissions cooperating said light separately with the respective said selective limiting components of said combined spectral character imparting and character segregating element, whereby said light is given said segregated improved invisible spectral difference.

13. The method of producing subjectively similar light having an improved invisible spectral difference, which includes the steps of subjecting light having a known predetermined spectral composition to the action of a combined spectral character imparting and character segregating element, said character imparting and segregating element having and including a plurality of known predetermined differing wave length-selective, wave length-limiting, components, said components being each coordinated in a predetermined manner with said predetermined spectral composition of said light, and with the spectral composition of each other, said components each transmitting substantially only certain known predetermined wave lengths of the said light, the selective transmission of each of said components for said light having the same centroid, cooperating said light separately with the respective said selective limiting components of said combined spectral character imparting and character segregating element, whereby said light is given said segregated improved invisible spectral difference.

14. The method of producing a visual effect which includes the step of providing in a scene a certain number of a plurality of objects, each said object having a certain known, predetermined color, said colors having respectively an invisible spectral difference, the spectral composition of each said object color having substantially the same center of gravity, and substantially the same hue, the spectral composition of a certain selected number of said object colors consisting of a plurality of bright bands separated by a dark band, restricting, by means of a suitable filter, at will the light reaching the eye from said scene to a certain known spectral composition coordinated with that of each of said compositions, and different from any, but including a substantial part of each, whereby said difference in the composition of said colors is made manifest.

15. The method of producing a visual effect which includes the steps of providing in a scene a certain number of a plurality of objects, each said object having a certain known predetermined color, said colors having respectively an invisible spectral difference, the spectral composition of each said object color having substantially the same center of gravity, and substantially the same hue, the spectral composition of a certain selected number of said object colors consisting of a plurality of bright bands separated by a dark band, restricting at will, by means of a certain respective one of a plurality of differing light filters, the light reaching the eye to wave lengths included in a chosen one of said compositions, observing respectively each said object with its said certain respective filter, using the same ocular focus with said respective filters, the light of said chosen composition being substantially unrestricted, while said other compositions are substantially excluded.

16. The method of producing subjectively similar light having an invisible spectral difference, which includes the steps of subjecting a plurality of beams of light respectively to the selective absorption of a plurality of different filters, the respective transmissions of said filters having substantially the same spectral center of gravity, the respective transmissions of said filters having differing spectral composition.

17. The method of producing subjectively similar light having an invisible spectral difference, which includes the steps of subjecting a plurality of beams of light respectively to the selective absorption of a plurality of different filters, the respective transmissions of said filters having substantially the same spectral center of gravity, and substantially the same hue, the respective transmissions of said filters having differing spectral composition.

18. The method of producing subjectively similar light having an invisible spectral difference, which includes the steps of subjecting a plurality of beams of light respectively to the selective absorption of a plurality of different filters, the respective transmissions of said filters having substantially the same spectral center of gravity, and substantially the same hue, the respective transmissions of said filters having differing spectral composition, the selective transmission of each said filter being substantially non-inclusive of the transmission of any other said filter.

19. The method of producing subjectively similar light having an invisible spectral difference, which includes the steps of subjecting a plurality of beams of light respectively to the selective absorption of a plurality of different filters, the respective transmissions of said filters having substantially the same spectral center of gravity, and substantially the same hue, the respective transmissions of said filters having differing spectral composition, the selective transmission of each said filter including a plurality of bright spectral bands separated by dark spectral bands, the said bright spectral bands of each filter occupying substantially the spectral position included in dark spectral bands of the said selective transmissions of said other filters.

20. The method of producing subjectively similar light having an invisible spectral difference, which includes the steps of subjecting a plurality of beams of light respectively to the selective absorption of a plurality of different filters, the respective transmissions of said filters having substantially the same spectral center of gravity, and substantially the same hue, the respective transmissions of said filters having differing spectral composition, the selective transmission of each said filter including a plurality of bright spectral bands separated by dark spectral bands, the said bright spectral bands of each filter occupying substantially the spectral position included in dark spectral bands of the said selective transmissions of said other filters, the selective transmission of each said filter having substantially the same brightness.

21. The method of producing subjectively similar light having an invisible spectral difference, which includes the steps of subjecting a plurality of beams of light respectively to the selective absorption of a plurality of different filters, the respective transmissions of said filters having substantially the same spectral center of gravity, and substantially the same hue, the respective transmissions of said filters having differing spectral composition, the selective transmission of each said filter including a plurality of bright spectral bands separated by dark spectral bands, the said bright spectral bands of each filter occupying substantially the spectral position included in dark spectral bands of the said selective transmissions of said other filters, the selective transmissions of each said filter having substantially the same brightness, the selective transmission of each filter being substantially constant throughout its area.

22. In the production of a light effect wherein are utilized two spectral compositions having a spectral difference invisible in their light, the method of distributing the total of utilized wave lengths between the two said compositions, which consists of dividing said wave lengths into several consecutive spectral bands, including only all alternate bands in one said spectral composition, including only the remaining bands in the other said composition, the sum of said spectral bands in one said spectral composition having substantially the same spectral center of gravity as the total of the sum of the said bands of the other said spectral composition, and each composition having substantially the same hue.

23. The method of producing coordinate differing visual effects which includes the steps of projecting upon a scene a plurality of beams of subjectively similar light having substantially the same spectral center of gravity, associating therewith a suitable selective element, said selective element being coordinated in a predetermined manner with the said spectral compositions of said beams, said element utilizing and revealing the difference in said beams.

24. The method of producing coordinate differing visual effects which includes the steps of projecting upon a scene a plurality of beams of subjectively similar light having substantially the same spectral center of gravity, associating therewith a suitable selective element, said selective element being coordinated in a predetermined manner with the said spectral compositions of said beams, said element utilizing and revealing the difference in said beams, the light of each said beam including substantially no wave lengths included in any other said beam, the spectral composition of each beam including bright bands separated by a dark band, the spectral position of the bright bands of the respective beams being coordinated in a predetermined manner, the bright spectral bands of each beam being substantially included in the dark bands of the other beams.

25. The method of producing a plurality of coordinate differing visual effects which includes the steps of projecting upon an object objectively homogeneous as to color a plurality of beams of subjectively similar light, said beams having an invisible spectral difference and substantially the same spectral center of gravity, one of said beams having a spectrum including two bright bands separated by a dark band, the said color of said object being different from that of the beam, whereby when either beam strikes the object, the subjective color of the object will change.

26. The method of producing a plurality of coordinate differing visual effects which includes the steps of projecting upon an object objectively homogeneous as to color a plurality of beams of subjectively similar light, said beams having an invisible spectral difference and substantially the same spectral center of gravity, each of said beams including substantially no wave lengths included in any other said beam, one of said beams having a spectrum including two bright bands separated by a dark band, the said color of said object being different from that of the beam, whereby when either beam strikes the object, the subjective color of the object will change.

27. The method of producing a plurality of coordinate differing visual effects which includes the steps of projecting upon an object objectively homogeneous as to color a plurality of beams of subjectively similar light, said beams having an invisible spectral difference and substantially the same spectral center of gravity, each of said beams including substantially no wave lengths included in any other said beam, the spectral composition of each said beam including a plurality of bright spectral bands separated by a dark band, the bright spectral bands of each beam occupying substantially the spectral position included in dark bands of said other filters, one of said beams having a spectrum including two bright bands separated by a dark band, the said color of said object being different from that of the beam, whereby when either beam strikes the object, the subjective color of the object will change.

28. The method of producing two coordinate visual effects which includes the steps of projecting upon a scene having a plurality of objective colors of known spectral compositions, said colors being visible and subjectively different, a plurality of beams of subjectively similar light, said beams differing from each other in spectral composition, the spectral compositions of said beams being coordinated with the spectral compositions of certain of said objective colors in a known predetermined manner, the spectral compositions of each of said beams including a differing portion of each of the said spectral compositions of said objective colors, whereby when either beam strikes said scene to the exclusion of the other said beam, each said certain subjectively different color will have a different combination of its component hue, saturation and brightness qualities, said subjectively different colors, when changed, still having a subjective color difference one from another.

29. The method of producing two coordinate visual effects which includes the steps of projecting upon a scene having a plurality of objective colors of known spectral compositions, said colors being visible and subjectively different, a plurality of beams of subjectively similar light, said beams differing from each other in spectral composition, the respective spectral compositions of said beams having substantially the same spectral center of gravity, the spectral compositions of said beams being coordinated with the spectral compositions of certain of said objective colors in a known predetermined manner, the spectral compositions of each of said beams including a differing portion of each of the said spectral compositions of said objective colors, whereby when either beam strikes said scene to the exclusion of the other said beam, each said certain subjectively different color will have a different combination of its component hue, saturation and brightness qualities, said subjectively different colors, when changed, still having a subjective color difference one from another.

30. The method of producing two coordinate visual effects which includes the steps of projecting upon a scene having a plurality of objective colors of known spectral compositions, said colors being visible and subjectively different, a plurality of beams of subjectively similarly light, said beams differing from each other in spectral composition, the respective spectral compositions of said beams having substantially the same spectral center of gravity, the spectral composition of each said beam including substantially no wave lengths of the other said beam, the spectral compositions of said beams being coordinated with the spectral compositions of certain of said objective colors in a known predetermined manner, the spectral compositions of each of said beams including a differing portion of each of the said spectral compositions of said objective colors, whereby when either beam strikes said scene to the exclusion of the other said beam, each said certain subjectively different color will have a different combination of its component hue, saturation and brightness qualities, said subjectively different colors, when changed, still having a subjective color difference one from another.

31. The method of producing two coordinate visual effects which includes the steps of projecting upon a scene having a plurality of objective colors of known spectral compositions, said colors being visible and subjectively different, a plurality of beams of subjectively similar light, said beams differing from each other in spectral composition, the respective spectral compositions of said beams having substantially the same spectral center of gravity, the spectral composition of each said beam including substantially no wave lengths of the other said beam, each said beam including a plurality of bright spectral bands separated by a dark band, the bright spectral bands of one beam occupying substantially the spectral position of dark spectral bands of the other beam, the spectral compositions of said beams being coordinated with the spectral compositions of certain of said objective colors in a known predetermined manner, the spectral compositions of each of said beams including a differing portion of each of the said spectral compositions of said objective colors, whereby when either beam strikes said scene to the exclusion of the other said beam, each said certain subjectively different color will have a different combination of its component hue, saturation and brightness qualities, said subjectively different colors, when changed, still having a subjective color difference one from another.

32. The method of producing two coordinate visual effects which includes the steps of projecting upon a scene having a plurality of objective colors of known spectral compositions, said colors being visible and subjectively different, a plurality of beams of subjectively similar light, said beams differing from each other in spectral composition, the respective spectral compositions of said beams having substantially the same spectral center of gravity, the spectral composition of each said beam including substantially no wave lengths of the other said beam, each said beam including a plurality of bright spectral bands separated by a dark band, the bright spectral bands of one beam occupying substantially the spectral position of dark spectral bands of the other beam, and in addition some predetermined portion of the bright bands of the other beam, the light of said portions having a certain selected substantially common subjective color, the spectral compositions of said portions being coordinated with certain other of said object colors, said other object colors spectrally comprising substantially the sum of said portions, the spectral compositions of said beams being coordinated with the spectral compositions of certain of said objective colors in a known predetermined manner, the spectral compositions of each of said beams including a differing portion of each of the said spectral compositions of said objective colors, whereby when either beam strikes said scene to the exclusion of the other said beam, each said certain subjectively different color will have a different combination of its component hue, saturation and brightness qualities, said subjectively different colors, when changed, still having a subjective color difference one from another.

33. The method of producing two coordinated differing visual effects, which includes the steps of preparing an object with a plurality of objective colors of predetermined known spectral composition, said colors being visible and subjectively different, subjecting said object to illumination by light of known predetermined spectral composition, restricting by means of a chosen one of a plurality of suitable light filters, the light reaching the eye to a known predetermined spectral composition, each said filter having a different known predetermined selective transmission, said selective transmission being coordinated in a predetermined manner with said known spectral compositions respectively of said illuminating light, and of certain said object colors, the said selective transmission of each of said filters for said illuminating light having substantially the same spectral center of gravity, and the same hue, the selective transmission of one of said filters consisting of a plurality of bright spectral bands separated by a dark band, whereby when either filter is placed between the eye the object, certain of said colors will change, said change of color being a predetermined intentional alteration of the hue, saturation or brightness of said color.

34. The method of producing two coordinated differing visual effects, which includes the steps of preparing an object with a plurality of objective colors of predetermined known spectral composition, said colors being visible and subjectively different, subjecting said object to illumination by light of known predetermined spectral composition, restricting by means of a chosen one of a plurality of suitable light filters, the light reaching the eye to a known predetermined spectral composition, each said filter having a different known predetermined selective transmission, said selective transmission being coordinated in a predetermined manner with said known spectral compositions respectively of said illuminating light, and of certain said object colors, the said selective transmission of each of said filters for said illuminating light having substantially the same spectral center of gravity, and the same hue, the selective transmission of each filter consisting of bright spectral bands separated by a dark band, the bright spectral bands of one said filter occupying substantially the spectral position of the dark spectral bands of another said filter, whereby when either filter is placed between the eye and the object, certain of said colors will change, said change of color being a predetermined intentional alteration of the hue, saturation or brightness of said color.

35. The method of producing two coordinated differing visual effects which includes the steps of projecting upon a scene in which a certain objective color having a known predetermined spectral composition is included, a plurality of beams of subjectively similar light, said beams having substantially the same spectral center of gravity, said beams having an invisible spectral difference, the spectrum of each beam including a plurality of bright bands separated by a dark band, the dark bands of the spectrum of one of said beams occupying substantially the position of the bright bands of the spectrum of the other said beam, the spectral composition of said certain objective color being coordinated with and distributed in a predetermined manner between the said spectral compositions of said beams, the subjective color of the portion of said spectral composition of said certain objective color included in the spectrum of said beam being distinctly different from the subjective color of the portion included in the spectrum of the other said beam, whereby when either of the beams strikes said certain subjective color, the subjective color of the latter will change, said scene having other objective colors, the spectral composition of said other colors being also coordinated with the said spectrums of said beams, the subjective color of the portion of the spectral composition of each said other objective color included in the spectrum of one said beam being substantially the same as the subjective color of the portion included in the spectrum of the other said beam, whereby when either of said beams strikes said other objective colors their respective subjective colors are maintained substantially unchanged, said change and maintenance of the respective appearances of said objective colors being effected simultaneously.

36. The method of producing a light effect which includes the steps of providing a scene including a plurality of objectively different colors, which colors are visible and subjectively different, of determining the spectral composition of the light reaching the eye from said objectively different colors, determining the spectral composition of the light which would reach the eye from an objectively white object if placed in said scene, restricting the light reaching the eye from said scene by means of a light filter, said filter having a selective transmission the spectral composition of which has substantially the same center of gravity as the said spectral composition of light from said white object, the spectral composition of the selective transmission of said filter consisting of a plurality of bright spectral bands separated by a dark band, the spectral position of said bright bands being coordinated also with the said spectral compositions reaching the eye from certain of said objectively different colors, said bright filter bands including substantially the whole of the spectral compositions of said certain objectively different colors, the spectral position of said bright filter bands being also coordinated with the said spectral compositions of the other of said plurality of objectively different colors, said bright filter bands including a portion of the spectral composition of each of said other objectively different colors subjectively substantially similar in hue to the unrestricted light from said other objectively different colors, said portion being a relatively small part of its respective spectral composition, whereby when the light from said scene is restricted by said filter, the relative appearance of said certain objectively different colors compared to the said other objective different colors, is changed.

37. The method of producing two coordinate visual effects which includes the steps of projecting simultaneously on a scene two beams of light, said beams having substantially the same hue and the same brightness, said beams having an invisible spectral difference, said beams having substantially the same spectral center of gravity, the spectral composition of each of said beams consisting of a plurality of bright bands separated by a dark band, the bright spectral bands of each of said beams occupying substantially the position of the dark bands of the spectrum of the other said beams, restricting the light reaching the eye from said scene by means of a chosen one of two light filters, one of said filters having a selective absorption substantially identical with the spectral composition of one said beam, the other filter having a selective absorption substantially identical with the spectral composition of the other said beam, placing respectively one of said filters before each of one set of eyes, simultaneously placing the other said filter before each of another set of eyes, whereby the scene is made visible substantially in its natural colors simultaneously to both sets of eyes, by light subjectively similar but objectively different and segregated.

38. The method of producing two segregated coordinate visual effects which include a common feature which includes the steps projecting simultaneously on a scene two beams of light, said beams having substantially the same hue, and the same brightness, said beams having an invisible spectral difference, said beams having substantially the same spectral center of gravity, the spectral composition of each of said beams consisting of a plurality of bright bands separated by a dark band, the bright spectral bands of each of said beams occupying substantially the position of the dark bands of the spectrum of the other said beam, said scene including a certain light feature of known spectral composition, said known spectral composition being limited to substantially one subjective color, said bright spectral bands of said beams being positioned in a predetermined manner in coordination with the said limited spectrum of said light feature, said limited spectrum of said light feature being apportioned between the spectrums of said beams, the light of the respective portions of said limiting spectrum having substantially the same subjective color and effect as that of the total of said restricted spectrum, restricting the light reaching the eye from said scene by means of two light filters, one of said filters having a selective absorption substantially identical with the spectral composition of one said beam, the other filter having a selective absorption substantially indentical with the spectral composition of the other said beam placing one of said filters before each of one set of eyes, simultaneously placing the other said filter before each of another set of eyes, whereby the scene is made visible substantially in its natural colors simultaneously to both sets of eyes, by light subjectively similar but objectively different and segregated.

39. The method of producing light effects which includes the steps of coloring a scene with colors which are subjectively similar, but objectively dissimilar, due to an invisible spectral difference, utilizing said invisible spectral difference to segregate desirable objective differences in a visual effect, and associating therewith means for revealing the said segregated desirable objective differences in a visual effect as subjective differences, while maintaining said subjective similarity of color, by suitably restricting the light reaching the eye.

40. The method of producing a visual effect within which is a desirable constant subjective difference in effect, while maintaining desirable constant subjective similarities between said subjective differences of effect, which includes the steps of applying color of predetermind known qualities of reflection, and possessed of an invisible spectral difference, to a suitable object, utilizing said invisible spectral difference to segregate desirable objective differences in visual effect, cooperating constantly with the light reflected from said applied color, a revealing system of filters to reveal the said objective difference as a desirable constant subjective difference in visual effect while revealing said colors of invisible spectral difference as subjectively similar.

41. The method of producing a binocular visual effect which includes the steps of applying to an object two colors having substantially the same spectral center of gravity and substantially the same subjective appearance, but having a substantially complete invisible spectral difference, said colors being applied positionally segregated to form respectively the coordinate and coordinated components of a compound visual effect, the said components having a known predetermined desirable visible difference, the said components having substantially the same color, subjecting said object to illumination by light having a spectral composition including the said spectral compositions of both said colors, restricting by means of a revealing filter the light reaching one eye to the spectral composition of the suitable one of said components, restricting by means of another revealing filter the light reaching the other eye to the spectral composition of the other of said components, the selective transmission of each said filter being substantially homogeneous throughout its area, viewing said components of said compound visual effect simultaneously with the two eyes, revealing in said compound visual effect a predetermined known constant subjective effect of said desirable visible difference between the said components, revealing said compound visual effect as of the same color to each eye, revealing said compound visual effect in sharp focus to both eyes simultaneously.

42. As an article of manufacture, a stereoscopic scene wherein the two stereoscopic components are respectively composed of colors having a substantially complete objective spectral difference, but substantially the same spectral center of gravity.

43. The method of producing a binocular visual effect which includes the steps of applying to an object two colors having substantially the same spectral center of gravity and substantially the same subjective appearance, but having a substantially complete invisible spectral difference, the spectral composition of each of said colors consisting of a plurality of bright spectral bands separated by a dark band, the bright spectral bands of one said color occupying substantially the spectral position of the dark bands of the other said spectral composition, said colors being applied positionally segregated to form respectively the coordinate and co-ordinated components of a compound visual effect, the said components having a known predetermined desirable visible difference, the said components having substantially the same color, subjecting said object to illumination by light having a spectral composition including the said spectral compositions of both said colors, restricting by means of a revealing filter the light reaching one eye to the spectral composition of the suitable one of said components, restricting by means of another revealing filter the light reaching the other eye to the spectral composition of the other of said components, the selective transmission of each said filter being substantially homogeneous throughout its area, viewing said components of said compound visual effect simultaneously with the two eyes, revealing in said compound visual effect a predetermined known constant subjective effect of said desirable visible difference between the said components, revealing said compound visual effect as of the same color to each eye, revealing said compound visual effect in sharp focus to both eyes simultaneously.

44. The method of producing a binocular visual effect which includes the steps of applying to an object a plurality of subjectively different colors, each of said colors being divided into pairs of subjectively substantially similar but objectively different portions, the members of each said pair having a substantially complete invisible spectral difference, the spectral composition of one said portion of each of said plurality of colors being included in a first predetermined known limiting spectral composition, the spectral composition of the other said portion of each of said plurality of colors being included in a second predetermined known limiting spectral composition, said limiting compositions having substantially the same spectral center of gravity, said limiting compositions each consisting of a plurality of bright spectral bands separated by a dark spectral band, the bright bands of each said limiting spectral composition occupying substantially the spectral position of the dark bands of the other said limiting spectral composition, each of said plurality of colors being applied in said pairs of invisibly differing portions, the members of said pairs being positionally segregated to form respectively the two components of a compound visual effect, said components being coordinate and coordinated, the said components having a known predetermined desirable visible difference, the said components being subjectively of substantially the same color, all the said portions utilized for one of said components being included in one of said limiting spectral compositions, all the said portions utilized for the other said components being including in the other said limiting spectral composition, subjecting said object to illumination by light having a spectral composition including both said limiting spectral compositions, restricting by means of a revealing filter the light reaching one eye to the suitable one of said limiting spectral compositions, restricting by means of another revealing filter the light reaching the other eye to the other of said limiting spectral compositions, the selective transmission of each said filter being homogeneous throughout its area, viewing said components of said compound visual effect simultaneously with the two eyes, revealing in said compound visual effect a predetermined known constant subjective effect of said desirable visible difference between the said components, revealing said compound visual effect substantially in all said plurality of subjectively different colors to each eye, revealing said compound visual effect in sharp focus to both eyes simultaneously.

45. As an article of manufacture, a stereoscopic scene wherein the two stereoscopic components are respectively composed of colors having a substantially complete objective spectral difference, all colors composing one component having their respective spectral compositions included in a first known predetermined limiting spectral composition, all colors composing the other component having their respective spectral compositions included in a second known predetermined limiting spectral composition, said limiting spectral compositions having the same center of gravity, each said limiting spectral composition including bright spectral bands separated by a dark band, the bright bands of each of said limiting spectral compositions occupying substantially the spectral position of the dark spectral band of the other said limiting spectral composition.

46. The method of producing in subjectively similar light, two components of a compound visual effect, wherein the said components have an intentional predetermined coordinated difference, which method includes the steps of projecting simultaneously upon a suitable object, objectively homogeneous as to color, two beams of light having substantially complete invisible spectral difference and substantially the same spectral center of gravity, utilizing one said projected beam to produce one of said components by introducing a suitable element in said beam, similarly utilizing the other said projected beam to produce the other said component, whereby said components become an apparent physical characteristic of said object.

47. The method of producing two components of a compound visual effect which includes the steps of projecting simultaneously on a substantially white screen two beams of substantially white light, said beams having an invisible spectral difference and substantially the same spectral center of gravity, the spectral composition of each said beam being comprised of a plurality of bright spectral bands separated by a dark band, the said spectral compositions being coordinated and coordinate, the bright bands of each said composition occupying substantially the spectral position of the dark bands of the other, utilizing one said projected beam to produce one of said components by introducing a suitable element in said beam, similarly utilizing the other said projected beam to produce the other said component, whereby during said projection said components become an apparent physical chartertistic of said screen.

48. The method of producing two coordinated subjectively differing visual effects in subjectively similar light, which includes the steps of projecting sensibly constantly upon a suitable object, objectively homogeneous as to color, a plurality of beams of light having substantially the same spectral center of gravity, and substantially a complete invisible spectral difference, said beams having substantially the same color, utilizing one said projected beam to produce one of said visual effects by introducing a suitable element into said beam, similarly utilizing the other said beam to produce the other of said visual effects, revealing said visual effects as constantly different but in similar light by restricting at will the light reaching the eye to wave lengths comprised in the chosen one of said visual effects.

49. The method of producing two light components of a compound light effect which includes the steps of cooperating with light a combined character imparting and character segregating element, by subjecting said light to selective absorption by said element, after such cooperation said light being and consisting of two coordinate directionally segregated predetermined coordinated differing spectral compositions, said directional segregation being coordinated and controlled in a known predetermined manner, said spectral compositions having the same spectral center of gravity, said spectral compositions having substantially a complete difference, the light of the said two compositions being subjectively similar in color, one of said spectral compositions consisting of a plurality of bright bands separated by a dark band.

50. The method of producing two light components of a compound light effect, which includes the steps of cooperating with light a combined character imparting and character segregating element by subjecting said light to selective absorption by said element, after such cooperation said light having and including a plurality of coordinate differing pairs of directionally segregated predetermined coordinated differing spectral compositions, said directional segregation being controlled and coordinated in a known predetermined manner, the said differing spectral compositions of each said pair having a substantially complete spectral difference, the light of the said two spectral compositions of each said pair appearing subjectively similar in color, the light of each respective said pair of spectral compositions being objectively and subjectively different from that of any other pair, one said spectral composition of each of all said pairs being substantially included in and forming part of a certain first known predetermined limiting spectral composition, said limiting spectral composition consisting of a plurality of bright spectral bands separated by a dark band, the other said spectral composition of each of all said pairs being substantially included in and forming a part of a certain second known predetermined limiting spectral composition, said second limiting spectral composition consisting of a plurality of bright spectral bands separated by a dark band, the bright bands of one said limiting spectral composition occupying substantially the spectral position of the dark bands of said other limiting composition, the two said limiting spectral compositions having substantially the same spectral center of gravity and substantially the same color.

51. The method of producing two light components of a compound light effect which includes the steps of cooperating with light a combined character imparting and character segregating element, by subjecting said light to selective absorption by said element, after such cooperation said light being and consisting of two coordinate directionally segregated predetermined coordinated differing spectral compositions, said directional segregation being coordinated and controlled in a known predetermined manner, said spectral compositions having the same spectral center of gravity, said spectral compositions having substantially a complete difference, the light of the said two compositions being subjectively similar in color, one of said spectral compositions consisting of a plurality of bright bands separated by a dark band, cooperating said coordinated and segregated light with a revealing element simultaneously restricting the light reaching each eye respectively to a different chosen one of said spectral compositions, and revealing said segregation in subjectively similar light.

52. The method of producing two light components of a compound light effect, which includes the steps of cooperating with light a combined character imparting and character segregating element by subjecting said light to subjective absorption by said element, after such cooperation said light having and including a plurality of coordinate differing pairs of directionally segregated predetermined coordinated differing spectral compositions, said directional segregation being controlled and coordinated in a known predetermined manner, the said differing spectral compositions of each said pair having a substantially complete spectral difference, the light of the said two spectral compositions of each said pair appearing subjectively similar in color, the light of each respective said pair of spectral compositions being objectively and subjectively different from that of any other pair, one said spectral composition of each of all said pairs being substantially included in and forming part of a certain first known predetermined limiting spectral composition, said limiting spectral composition consisting of a plurality of bright spectral bands separated by a dark band, the other said spectral composition of each of all said pairs being substantially included in and forming a part of a certain second known predetermined limiting spectral composition, said second limiting spectral composition consisting of a plurality of bright spectral bands separated by a dark band, the bright bands of one said limiting spectral composition occupying substantially the spectral position of the dark bands of said other limiting composition, the two said limiting spectral compositions having substantially the same spectral center of gravity and substantially the same color, cooperating said coordinated and segregated light with a revealing element simultaneously restricting the light reaching each eye respectively to a different suitable one of said limiting spectral composition, and revealing said segregation in subjectively similar light of a plurality of colors.

53. The method of producing in a plurality of colors, a sensibly constant light effect having an alternating substantially invisible objective difference, which includes the step of providing two beams of light, temporarily cooperating each beam with a first character imparting element by introducing said element in said beam, such cooperating imparting to each beam a predetermined coordinate first spectral composition consisting of one bright band, the sum of said spectral compositions of the two beams being two bright spectral bands separated by a dark band, then temporarily replacing each of said first character imparting elements by a second character imparting element, cooperating each beam temporarily with said second character imparting element, such cooperating imparting to each beam a second spectral composition, said spectral composition of each beam likewise having a predetermined coordinate spectral composition consisting of one bright band, the sum of said second spectral compositions being likewise two bright spectral bands separated by a dark band, the bright spectral bands of the said sum of said second coordinated compositions occupying the spectral positions of the dark bands of the said sum of said first spectral compositions, continuing alternately the said first and second character imparting elements, so as to impart to the sum of said two beams an invisible alternating spectral difference, the sum of said beams having a substantially subjectively constant hue, projecting said two beams, each of said alternating objective compositions, upon a suitable screen, objectively undifferentiated as to color, producing in said projected light said constant light effect of invisibly varying spectral compositions, by introducing a suitable element in said beams.

54. The method of producing in a plurality of colors, a sensibly constant light effect having an alternating substantially invisible objective difference, which includes the step of providing two beams of light, temporarily cooperating each beam with a first character imparting element by introducing said element in said beam, such cooperating imparting to each beam a predetermined coordinate first spectral composition consisting of one bright band, the sum of said spectral compositions of the two beams being two bright spectral bands separated by a dark band, then temporarily replacing each of said first character imparting elements by a second character imparting element, cooperating each beam temporarily with said second character imparting element, such cooperating imparting to each beam a second spectral composition, said spectral composition of each beam likewise having a predetermined coordinate spectral composition consisting of one bright band, the sum of said second spectral compositions being likewise two bright spectral bands separated by a dark band, the bright spectral bands of the said sum of said coordinated compositions occupying the spectral positions of the dark bands of the said sum of said first spectral compositions, continuing alternately the said first and second character imparting elements, so as to impart to the sum of said two beams an invisible alternating spectral difference, the sum of said beams having a substantially subjectively constant hue, projecting said two beams, each of said alternating objective compositions, upon a suitable screen, objectively undifferentiated as to color, producing in said projected light said constant light effect of invisibly varying spectral compositions, by introducing a suitable element in said beams, cooperating said coordinated light with a revealing element restricting at will the light reaching the eye to a different chosen number of said limited spectral compositions.

55. The method of producing a light effect, which includes the steps of providing two beams of light, temporarily cooperating each beam with a first character imparting element by introducing said element in said beam, such cooperation imparting to each beam a predetermined coordinate first spectral composition consisting of one bright band, said spectral compositions being different and substantially non-inclusive of each other, then temporarily replacing each of said first character imparting elements by a second character imparting element, cooperating each beam temporarily with said second character imparting element, such cooperation imparting to each beam a predetermined coordinate second spectral composition, said second spectral composition of each beam likewise consisting of one bright band, said second spectral compositions likewise being different and substantially non-inclusive of each other, each of said second spectral compositions being substantially non-inclusive of either of said first spectral compositions, one of said second spectral compositions being coordinated with one of said first spectral compositions, the sum of these coordinated compositions being included in a certain known predetermined first limiting spectral composition, the other of said second spectral compositions being coordinated with the other of said first spectral compositions, the sum of these other coordinated compositions being included in a certain known predetermined second limiting spectral composition, the two said limiting spectral compositions having substantially the same center of gravity and their light being subjectively similar, the two spectral compositions included in one said limiting spectral composition being confined to and included in a selected one of said beams, the two compositions included in the other said limiting composition being confined to and included in the other said beam, continuing alternately with said first and second character imparting elements to impart to the sum of said beams a segregated subjectively constant coordinated substantially complete invisible spectral difference, each of said beams subjectively having constantly substantially the same hue but an objective alternation of spectral components, projecting said two beams upon a suitable screen, objectively undifferentiated as to color, producing in said projected light a constant light effect including coordinated segregated invisible spectral differences of invisibly varying spectral composition.

56. The method of producing a visual effect which includes the steps of subjecting a plurality of light-sensitive surfaces respectively to a plurality of beams of light, said beams being coordinate and coordinated with respect to their spectral compositions, said beams being respectively of substantially entirely different spectral compositions, said beams being each a bright-band component of a subjective white, the sum of said beams being substantially the sum of two subjective whites of different objective spectral composition, recording on each of said light-sensitive surfaces a suitable component of a stereoscopic scene by interposing a suitable element in the respective beam restricted to each respective light-sensitive surface, and coordinating and utilizing these light sensitive surfaces in the production of said stereoscopic effect.

57. The method of producing a stereoscopic scene having desirable subjective similarities between the stereoscopic units, which includes the steps of preparing the stereoscopic units respectively in colors having an invisible spectral difference, and requiring the same ocular focus, revealing said scene as subjectively stereoscopic by sensibly simultaneously restricting, by means of a suitable element, the light reaching each eye respectively to the spectral composition in which the proper stereoscopic unit for that eye is prepared.

58. The method of producing a scene which includes the steps of projecting sensibly simultaneously a plurality of images in subjectively similar light having respectively a differing spectral composition, said differing spectral compositions having substantially a common center of gravity, said images being sensibly superposed, said images requiring substantially the same ocular focus, whereby the sum of said images appears as a sensibly constant scene having invisible spectral differences of color.

59. The method of producing a scene which includes the steps of projecting upon a scene free from invisible spectral differences of color, an image comprising an invisible spectral difference of color, whereby said scene is lent said invisible difference of color.

60. The method of producing a scene, which includes the steps of projecting upon a scene free from invisible spectral differences of color, an image comprising certain colors each of which has a plurality of differing spectral compositions, said differing spectral compositions of each said certain color having substantially the same centroid, whereby said certain colors of plural spectral composition are lent to said scene.

61. The method of preparing a scene having invisible differences of color, which includes the steps of projecting sensibly constantly upon an object, objectively homogeneous as to color, an image comprising invisible spectral differences, the invisibly different spectral compositions of any one color having substantially the same center of gravity, the said invisible differences being substantially complete.

62. The method of producing in subjectively similar light two components of a compound visual effect, which method includes the steps of projecting sensibly simultaneously on a suitable object, objectively homogeneous as to color, two sensibly constant images, said images having an intentional, predetermined, coordinate and coordinated visible difference, said images having a substantially complete invisible spectral difference of color, the sum of all the spectral compositions of each of said images having substantially the same spectral center of gravity as the sum of the spectral compositions comprising the other.

63. The method of producing a scene which includes the steps of projecting sensibly simultaneously a plurality of images in subjectively similar light having respectively a differing spectral composition, said differing spectral compositions having substantially a common center of gravity, said images being sensibly superposed, said images requiring substantially the same ocular focus, whereby the sum of said images appears as sensibly constant scene having invisible spectral differences of color, cooperating with said scene a combined segregating and revealing element, by placing said element between said scene and the observer.

64. The method of producing a scene which includes the steps of projecting sensibly simultaneously a plurality of images in subjectively similar light having respectively a differing spectral composition, said differing spectral compositions having substantially a common center of gravity, said images being sensibly superposed, said images requiring substantially the same ocular focus, whereby the sum of said images appears as sensibly constant scene having invisible spectral differences of color, revealing said invisible differences in said scene at will, by interposing between the eye and said scene one of a plurality of filters, said filters each having a selective transmission substantially constant throughout its area, each said filter, respectively restricting the light reaching the eye to that of a different one of said images.

65. The method of producing a scene which includes the steps of projectingسensibly simultaneously a plurality of images in subjectively similar light having respectively a differing spectral composition, said differing spectral compositions having substantially a common center of gravity, said images being sensibly superposed, said images requiring substantially the same ocular focus, whereby the sum of said images appears as sensibly constant scene having invisible spectral differences of color, revealing said invisible differences in said scene simultaneously as differences while preserving said invisible differences of color, as such, by interposing sensibly simultaneously between said scene and the observer a coordinate, coordinated pair of filters, each filter being homogeneous as to selective transmission throughout its area, each said filter transmitting substantially no light transmitted by the other said filter, one of said filters transmitting substantially all the light of a certain chosen number of said plurality of images, the other of said filters transmitting substantially all the light of the other of said plurality of images, utilizing the same ocular focus to view said scene through either of said filters, restricting the filters respectively each to one eye.

66. The method of producing a scene which includes the steps of projecting upon a scene free from invisible spectral differences of color, an image comprising an invisible spectral difference of color, whereby said scene is lent said invisible difference of color, revealing said invisible differences in said scene at will by interposing between the eye and said scene one of a plurality of filters, said filters each having a selective transmission substantially constant throughout its area, each said filter respectively restricting the light reaching the eye to that of a different one of said spectral compositions included among said invisible differences of color.

67. The method of producing a scene which includes the steps of projecting upon a scene free from invisible spectral differences of color, an image comprising an invisible spectral difference of color, whereby said scene is lent said invisible difference of color, revealing said invisible differences in said scene simultaneously as differences while preserving said invisible differences of color, as such, by interposing sensibly simultaneously between said scene and the observer a coordinate, coordinated pair of filters, each filter being homogeneous as to selective transmission throughout its area, each of said filters transmitting one of the invisibly different spectral compositions of said color, each said filter transmitting substantially no light transmitted by the other said filter, utilizing the same ocular focus to view said scene through either of said filters, restricting the filters respectively each to one eye.

68. The method of producing a scene, which includes the steps of projecting upon a scene free from invisible spectral differences of color, an image comprising certain colors each of which has a plurality of differing spectral compositions, said differing spectral compositions of each said certain color having substantially the same centroid, whereby said certain colors of plural spectral composition are lent to said scene, revealing said invisible differences in said image at will by interposing between the eye and said scene one of a plurality of differing filters, said filters each having a selective transmission substantially constant throughout its area, each said filter respectively restricting the spectral composition of the light reaching the eye to wave lengths included in certain selected units of the said plural compositions respectively of each of a chosen number of said colors.

69. The method of producing a scene, which includes the steps of projecting upon a scene free from invisible spectral differences of color, an image comprising certain colors each of which has a plurality of differing spectral compositions, said differing spectral compositions of each said certain color having substantially the same centroid, whereby said certain colors of plural spectral composition are lent to said scene, revealing certain of said invisible differences in said scene simultaneously as differences, while preserving said invisible differences of color as such, by interposing sensibly simultaneously between said scene and the observer a coordinate, coordinated pair of filters, each said filter being homogeneous as to selective transmission throughout its area, each said filter transmitting substantially all the light included in a certain one of the said plural compositions respectively of each of a chosen number of said colors, the other of said filters transmitting substantially all the light included in certain predetermined, known units of the said plural composition respectively of each of a chosen number of other said colors.

70. The method of preparing a scene having invisible differences of color, which includes the steps of projecting sensibly constantly upon an object, objectively homogeneous as to color, an image comprising invisible spectral differences, the invisibly different spectral compositions of any one color having substantially the same center of gravity, the said invisible differences being substantially complete, revealing said invisible differences in said image at will, by interposing between the eye and said scene one of a plurality of differing filters, said filters each having a selective transmission substantially constant throughout its area, each said filter respectively restricting the spectral composition of the light reaching the eye to wave lengths included in certain selected, predetermined, said invisibly different compositions respectively of a chosen number of said colors.

71. The method of preparing a scene having invisible differences of color, which includes the steps of projecting sensibly constantly upon an object, objectively homogeneous as to color, an image comprising invisible spectral differences, the invisibly different spectral compositions of any one color having substantially the same center of gravity, the said invisible differences being substantially complete, revealing certain of said invisible differences in said scene simultaneously as differences, while preserving said invisible differences of color as such, by interposing sensibly simultaneously a coordinate, coordinated pair of filters, each filter being homogeneous as to selective transmission throughout its area, each said filter transmitting substantially all the light included in a certain selected predetermined one of the said plural compositions respectively of each of a chosen number of said colors, the other of said filters transmitting substantially all the light included in certain, predetermined, known units of the said plural compositions respectively of each of a chosen number of other said colors.

72. The method of producing in subjectively similar light two components of a compound visual effect, which method includes the steps of projecting sensibly simultaneously on a suitable object, objectively homogeneous as to color, two sensibly constant images, said images having an intentional, predetermined, coordinate and coordinated visible difference, said images having a substantially complete invisible spectral difference of color, the sum of all the spectral compositions of each of said images having substantially the same spectral center of gravity as the sum of the spectral compositions comprising the other, revealing said invisible spectral difference between said components at will, by interposing between the eye and said components one of a plurality of filters, said filters each having a selective transmission substantially constant throughout its area, each said filter respectively restricting the light reaching the eye to that of a different one of said components.

73. The method of producing in subjectively similar light two components of a compound visual effect, which method includes the steps of projecting sensibly simultaneously on a suitable object, objectively homogeneous as to color, two sensibly constant images, said images having an intentional, predetermined, coordinate and coordinated visible difference, said images having a substantially complete invisible spectral difference of color, the sum of all the spectral compositions of each of said images having substantially the same spectral center of gravity as the sum of the spectral compositions comprising the other, segregating said components and revealing them as different, while preserving said invisible difference of color as a desirable similarity by interposing sensibly simultaneously between said components and the observer a coordinate, coordinated pair of filters, each filter being homogeneous throughout its area as to selective transmission, each said filter transmitting substantially no light transmitted by the other filter, one of said filters transmitting substantially all the light of one of said component, the other said filter transmitting substantially all the light of the other said component, utilizing the same ocular focus to view said components through either of said filters, restricting the filters respectively each to one eye.

74. The method of producing a light effect, which includes the steps of providing two beams of light, temporarily cooperating each beam with a first character imparting element by introducing said element in said beam, such cooperation imparting to each beam a predetermined coordinate first spectral composition consisting of one bright band, said spectral compositions being different and substantially non-inclusive of each other, then temporarily replacing each of said first character imparting elements by a second character imparting element, cooperating each beam temporarily with said character imparting element, such cooperation imparting to each beam a second spectral composition, said second spectral composition of each beam likewise having a predetermined coordinate spectral composition consisting of one bright band, said second spectral compositions likewise being different and substantially non-inclusive of each other, each of said second spectral compositions being substantially non-inclusive of either of said first spectral compositions, one of said second spectral compositions being coordinated with one of said first spectral compositions, the sum of these coordinated compositions being included in a certain known predetermined first limiting spectral composition, the other of said second spectral compositions being coordinated with the other of said first spectral compositions, the sum of these other coordinated compositions being included in a certain known predetermined second limiting spectral composition, the two said limiting spectral compositions having substantially the same center of gravity and their light being subjectively similar, the two spectral compositions included in one said limiting spectral composition being confined to and included in a selected one of said beams, the two compositions included in the other said limiting composition being confined to and included in the other said beam, continuing alternately with said first and second character imparting elements to impart to the sum of said beams a segregated subjectively constant coordinated substantially complete invisible spectral difference, each of said beams subjectively having constantly substantially the same hue but an objective alternation of spectral components, projecting said two beams upon a suitable screen, objectively undifferentiated as to color, producing in said projected light a constant light effect including coordinated segregated invisible spectral differences of invisibly varying spectral composition, cooperating said constant light effect with a combined segregating and revealing element, placed between the said light effect and the observer, said element simultaneously restricting the light reaching each eye respectively to a different suitable one of said limiting spectral compositions, and revealing said segregation in subjectively similar light of a plurality of colors.

75. The method of producing a visual effect, which includes the steps of projecting two stereoscopic part-images on a common screen each in light of wavelengths substantially not included in the light of the other said part-image, the light in which each part-image is respectively projected having the same spectral center of gravity, segregating, each to the proper eye, said images, and revealing said part-images simultaneously as a stereoscopic scene by interposing between said screen and the observer a pair of filters, said filters each being homogeneous as to selective transmission throughout its area, said filters differing in selective transmission, one said filter restricting the light reaching the proper eye to the light in which one said part-image was projected, the other said filter restricting the light reaching the other eye to the light of the other said part-image, viewing said stereoscopic scene simultaneously sharply defined to each eye, using the same physiological focus for each eye.

76. The method of producing a visual effect, which includes the steps of projecting two stereoscopic part-images on the same screen, suitable parts of said respective part-images being sensibly superposed on said screen, said part-images being each projected in light having a substantially complete difference of spectral composition from the light of said other part-image, said spectral composition having substantially the same center of gravity, and restricting by means of two differing light filters, the selective transmission of each of which is substantially the same throughout its area, the light sensibly reaching each respective eye to the spectral composition of the respective suitable one of said stereoscopic part-images, observing said part-images simultaneously with the same ocular focus.

77. The method of producing a light effect which includes the steps of projecting a plurality of images of a scene respectively upon a like plurality of recording surfaces, each said surface being exposed to but one of said images, certain of said plurality of images being projected with a stereoscopic difference from the remainder of said plurality of images, each image being projected respectively in light of wavelengths not included in the light in which any other said image is projected, the sum of all the light utilized in the said projection of all images which have a certain predetermined, proper one of said stereoscopic differences having substantially the same spectral center of gravity as the sum of all the lights utilized in the said projection of all images which have the other of said stereoscopic differences, utilizing and coordinating these records in any suitable manner in the production of a stereoscopic scene.

78. The method of producing a light effect, which includes the steps of projecting a plurality of images of a scene respectively upon a like plurality of recording surfaces, each said surface being exposed to but one of said images, certain of said plurality of images being projected with a stereoscopic difference from the remainder of said plurality of images, each image being projected respectively in light of wavelengths substantially not included in the light in which any other said image is projected, the sum of all light utilized in the said projection of all images which have a certain predetermined proper one of said stereoscopic differences being so chosen that after correction for difference between the selective sensitivity of the recording surface and that of a normal eye its stimulus for each of the color sensations of a normal observer is respectively substantially equal to the stimulus of the light used in the projection of all images which have the other stereoscopic difference, and utilizing and coordinating these records in the production of a stereoscopic scene.

79. The method of producing stereoscopic scene, which includes the steps of obtaining the plastic by use of double apparatus in photographing and projecting, restricting the light utilized both in taking and projecting of one said stereoscopic part-image to a certain limited spectral composition, restricting the light utilized both in taking and projecting the other stereoscopic part-image substantially to another limited completely different spectral composition, the light of said limited spectral compositions having substantially the same spectral center of gravity, and segregating said part-images, each to the proper eye, by simultaneously placing before each eye a filter restricting the light reaching that eye to wavelengths included in the restricted light utilized as aforesaid in the taking and projection of the stereoscopic part-image properly to be presented to that eye, each of said filters having throughout its area substantially constant selective transmission, the two said stereoscopic part-images being observed with the same ocular focus simultaneously by both eyes as well defined.

80. The method of producing a light effect, which includes the steps of providing a plurality of light-sensitive surfaces, making a plurality of records of a suitable scene, the making of each record including the step of projecting an image of said scene respectively on a different one of said plurality of light-sensitive surfaces, cooperating the projection of said images with a plurality of differing light filters, the selective transmission of each said filter being substantially the same throughout its area, after said cooperation the light reaching each said light-sensitive surface from said scene during said projection being restricted to light of known, predetermined wavelengths, substantially no wavelengths included in the said restricted light permitted to fall upon any one of said light sensitive surfaces being included in the respective light recording said scene on any of the other said light-sensitive surfaces, the respective predetermined spectral composition of the light restricted as aforesaid to each respective light-sensitive surface consisting of a single bright spectral band, said predetermined restricted spectral compositions being coordinated in pairs, the respective sums of each said pair of spectral compositions having substantially the same spectral center of gravity, each said light-sensitive surface being suitably sensitive to the wavelengths restricted to it, at will projecting all said records sensibly simultaneously upon a suitable object, objectively homogeneous as to color, each said record being projected in light of spectral composition substantially the same as that of the said restricted light by which said record was recorded, the comparative intensity of the light in which the respective unit records are respectively so projected being corrected for the difference between the selective color sensitivity of the respective said light-sensitive surfaces and the normal human eye, a certain, selected, predetermined, similar portion of each of the respective projected images of said records being sensibly superposed, said records being projected upon said object in pairs, each said pair being one of the coordinate, said coordinated pairs, whereby said scene is reproduced and appears on said object in light having an objectively constant spectral center of gravity.

81. The method of producing a light effect, which includes the steps of providing two light-sensitive surfaces, making a stereoscopic record of a suitable scene on said light sensitive surfaces by a procedure which includes the steps of projecting an image of said scene on each said light-sensitive surface, said images being projected respectively with a stereoscopic difference, cooperating with the projection of each said image a different light filter, the selective transmission of each said filter being substantially homogeous throughout its area, after said cooperation the light reaching said light-sensitive surface from said scene during said projection being restricted to light of known predetermined wavelengths, substantially no wavelengths included in the said restricted light permitted to fall upon one of said light-sensitive surfaces being included in the light recording said scene on the other said light-sensitive surface, the spectral composition of the light restricted to each respective light-sensitive surface having substantially the same center of gravity as that of the light restricted respectively to the other light-sensitive surface, each said light-sensitive surface being suitably sensitive to the wavelengths restricted to it.

82. The method of producing a light effect, which includes the steps of providing two light-sensitive surfaces, making a stereoscopic record of a suitable scene on said light sensitive surfaces by a procedure which includes the steps of projecting an image of said scene on each said light-sensitive surface, said images being projected respectively with a stereoscopic difference, cooperating with the projection of each said image a different light filter, the selective transmission of each said filter being substantially homogeneous throughout its area, after said cooperation the light reaching said light-sensitive surface from said scene during said projection being restricted to light of known predetermined wavelengths, substantially no wavelengths included in the said restricted light permitted to fall upon one of said light-sensitive surfaces being included in the light recording said scene on the other said light-sensitive surface, the spectral composition of the light restricted to each respective light-sensitive surface having substantially the same center of gravity as that of the light restricted respectively to the other light-sensitive surface, each said light-sensitive surface being suitably sensitive to the wavelengths restricted to it, at will projecting said stereoscopic unit records sensibly simultaneously upon a suitable object, objectively homogeneous as to color, said records being each projected in light having substantially the same center of gravity, each said record being projected in light of substantially the same spectral composition as that of the said restricted light in which it was recorded, the comparative intensity of the light in which the unit records are respectively so projected being corrected for the difference between the color sensitivity of the respective said light-sensitive surfaces and the human eye, certain selected, predetermined portions of the projected images of said records being sensibly superposed.

83. The method of producing a light effect, which includes the steps of providing two light-sensitive surfaces, making a stereoscopic record of a suitable scene on said light sensitive surfaces by a procedure which includes the steps of projecting an image of said scene on each said light-sensitive surface, said images being projected respectively with a stereoscopic difference, cooperating with the projection of each said image a different light filter, the selective transmission of each said filter being substantially homogeneous throughout its area, after said cooperation the light reaching said light-sensitive surface from said scene during said projection being restricted to light of known predetermined wavelengths, substantially no wavelengths included in the said restricted light permitted to fall upon one of said light-sensitive surfaces being included in the light recording said scene on the other said light-sensitive surface, the spectral composition of the light restricted to each respective light-sensitive surface having substantially the same center of gravity as that of the light restricted respectively to the other light-sensitive surface, each said light sensitive surface being suitably sensitive to the wavelengths restricted to it, at will projecting said stereoscopic unit records sensibly simultaneously upon a suitable object, objectively homogeneous as to color, said records being each projected in light having substantially the same center of gravity, each said record being projected in light of substantially the same spectral composition as that of the said restricted light in which it was recorded, the comparative intensity of the light in which the unit records are respectively so projected being corrected for the difference between the color sensitivity of the respective said light-sensitive surfaces and the human eye, certain selected, predetermined portions of the projected images of said records being sensibly superposed, restricting by means of two co-ordinated differing filters the light reaching each eye respectively substantially to the light of a suitable different one of said projected records, the selective transmission of each said filter being substantially homogeneous throughout its area, the spectral transmission respectively of the said filters having substantially the same center of gravity, the spectral transmission of each said filter being substantially exclusive of all wavelengths included in the transmission of the other, viewing said projected records together as a sharply defined stereoscopic reproduction of the original scene, each eye using the same physiological focus.

84. The method of producing a light effect, which includes the steps of providing a plurality of light-sensitive surfaces, making a plurality of records of a suitable scene on said surfaces, the procedure of the making of each said record including the step of projecting an image of said scene on a certain different one of said surfaces, half of said plurality of images being projected and recorded with a stereoscopic difference from the remaining half of said plurality of images, cooperating the projection of said images with a plurality of differing light filters, the selective transmission of each said filter being substantially the same throughout its area, after said cooperation the light reaching each light-sensitive surface from said scene during said projection being restricted to known, predetermined wavelengths, substantially no wavelengths included in the said restricted light permitted to fall upon any one of said light-sensitive surfaces being included in the light recording said scene on any other of said light-sensitive surfaces, the respective said predetermined spectral composition of the light restricted to each respective light sensitive surface consisting of a single bright band, said restricted spectral composition being coordinated in two coordinate groups, the sum of the spectral compositions included in one said group having the same spectral center of gravity as the sum of the spectral compositions included in the other said group, the spectral compositions of one said group being utilized exclusively in the recording of the records having a certain one of said stereoscopic differences, the spectral compositions of the other said group being utilized exclusively in the recording of the records having the other said stereoscopic difference, each said light-sensitive surface being suitably sensitive to the wavelengths restricted to it.

85. The method of producing a light effect, which includes the steps of providing a plurality of light-sensitive surfaces, making a plurality of records of a suitable scene on said surfaces, the procedure of the making of each said record including the step of projecting an image of said scene on a certain different one of said surfaces, half of said plurality of images being projected and recorded with a stereoscopic difference from the remaining half of said plurality of images, cooperating the projection of said images with a plurality of differing light filters, the selective transmission of each said filter being substantially the same throughout its area, after said cooperation the light reaching each light-sensitive surface from said scene during said projection being restricted to known, predetermined wavelengths, substantially no wavelengths included in the said restricted light permitted to fall upon any one of said light-sensitive surfaces being included in the light recording said scene on any other of said light-sensitive surfaces, the respective said predetermined spectral composition of the light restricted to each respective light sensitive surface consisting of a single bright band, said restricted spectral composition being coordinated in two coordinate groups, the sum of the spectral compositions included in one said group having the same spectral center of gravity as the sum of the spectral compositions included in the other said group, the spectral compositions of one said group being utilized exclusively in the recording of the records having a certain one of said stereoscopic differences, the spectral compositions of the other said group being utilized exclusively in the recording of the records having the other said stereoscopic difference, each said light-sensitive surface being suitably sensitive to the wavelengths restricted to it, at will projecting all said records sensibly simultaneously upon a suitable object, objectively homogeneous as to color, each said record being projected in light of spectral composition substantially the same as that of the light by which said record was recorded, the sum of the respective spectral compositions in which the members of one of said groups of records are projected having the same spectral center of gravity as the sum of the respective spectral compositions in which the members of the other of said groups of records are projected, the comparative intensity of the light in which the respective unit records are respectively so projected being corrected for the difference in light sensitiveness between the respective light-sensitive surface and the normal human eye, the respective projected images of said records being sensibly superposed at a certain selected, predetermined portion.

86. The method of producing a light effect, which includes the steps of providing a plurality of light-sensitive surfaces, making a plurality of records of a suitable scene on said surfaces, the procedure of the making of each said record including the step of projecting an image of said scene on a certain different one of said surfaces, half of said plurality of images being projected and recorded with a stereoscopic difference from the remaining half of said plurality of images, cooperating the projection of said images with a plurality of different light filters, the selective transmission of each said filter being substantially the same throughout its area, after said cooperation the light reaching each light-sensitive surface from said scene during said projection being restricted to known, predetermined wavelengths, substantially no wavelengths included in the said restricted light permitted to fall upon any one of said light-sensitive surfaces being included in the light recording said scene on any other of said light-sensitive surfaces, the respective said predetermined spectral composition of the light restricted to each respective light sensitive surface consisting of a single bright band, said restricted spectral composition being coordinated in two coordinate groups, the sum of the spectral compositions included in one said group having the same spectral center of gravity as the sum of the spectral compositions included in the other said group, the spectral compositions of one said group being utilized exclusively in the recording of the records having a certain one of said stereoscopic differences, the spectral compositions of the other said group being utilized exclusively in the recording of the records having the other said stereoscopic difference, each said light-sensitive surface being suitably sensitive to the wavelengths restricted to it, at will projecting all said records sensibly simultaneously upon a suitable object, objectively homogeneous as to color, each said record being projected in light of spectral composition substantially the same as that of the light by which said record was recorded, the sum of the respective spectral compositions in which the members of one of said groups of records are projected having the same spectral center of gravity as the sum of the respective spectral compositions in which the members of the other of said groups of records are projected, the comparative intensity of the light in which the respective unit records are respectively so projected being corrected for the difference in light sensitiveness between the respective light-sensitive surface and the normal human eye, the respective projected images of said records being sensibly superposed at a certain selected, predetermined portion, restricting by means of two coordinate, coordinated differing filters, said filters each having a selective absorption substantially the same throughout its area, the respective light reaching each eye substantially to the light included in and restricted to the projection of a suitable respective one of said stereoscopically different groups of records, viewing said projected records as a sharply defined stereoscopic reproduction of the original scene, each eye using the same ocular focus.

87. As an article of manufacture, for use in a viewing apparatus, two light filters lying substantially in the same plane, said filters being a certain predetermined distance apart, said filters each having a predetermined, known selective absorption for light, the said selective absorptions respectively of said filters being different, said filters each having likewise a selective transmission for radiation of wavelengths included in the known range of visible light, the said selective transmission of said filters being respectively different, the wavelengths included in the said selective transmission of each said filter being substantially not included in the wavelengths included in the said selective transmission of the other said filter, the respective said differing transmissions of said filters having the same centroid, the said selective transmission of each said filter being substantially the same throughout its area.

88. As an article of manufacture, for use in apparatus for viewing a scene, a plurality of coordinated, coordinate light filters having respectively completely different characteristics of selective transmission, the said characteristics of selective transmission of each of said plurality of coordinated filters having the same centroid, the said selective transmissions of each said filter being substantially the same throughout its area.

89. The method of producing a radiation effect in different wavelengths of radiation so as to utilize the differences in wavelength while maintaining desirable similarities in effect, which includes the steps of providing radiation of a known, predetermined totality and range of included wavelengths, dividing by any suitable means the total of utilized wavelengths into two spectral compositions, said spectral compositions having the same centroid, each said spectral composition including substantially no wavelengths included in the other said spectral composition, projecting radiation of both said spectral compositions on a suitable receiver, coordinating with said projected radiation suitable wavelength-selective traps, said traps segregating said spectral compositions, associating with said projection means for cooperating with said radiation an impressing element, said impressing element impressing respectively on each said group of wavelengths of said projected radiation a different variation of energy, and cooperating with said receiver suitable means for demonstrating the said impressed differences while so segragated in radiation having a common spectral centroid.

90. The method of producing a visual effect which includes the steps of providing a scene which includes an objective color of known, predetermined spectral composition, said scene being illuminated by light of known predetermined spectral composition, restricting at will, by means of a suitable filter homogeneous as to selective transmission throughout its area, the light reaching the eye from said scene to light of wavelengths included in a certain predetermined limited spectral composition differing from that of the said illuminating light, said limited spectral composition having substantially the same center of gravity as said spectral composition of the said illuminating light, said limited spectral composition of said restricted light consisting of a plurality of bright spectral bands separated by a dark band, the spectral position of said bands being coordinated in a predetermined manner with the said spectral composition of said objective color, said spectral composition of said restricted light lacking certain predetermined portions of the said spectral composition of said objective color, whereby the subjective appearance of said objective color in said scene will be different.

91. The method of producing a visual effect which includes the steps of providing in an illuminated scene an object including a certain objective color having a known predetermined spectral composition, said scene also including other color, said scene being illuminated by light of known spectral composition, restricting at will, by means of a suitable filter homogeneous as to selective transmission throughout its area, the light reaching the eye from said scene to light of wavelengths included in a certain predetermined limited spectral composition differing from that of the illuminating light, said limited spectral composition having substantially the same spectral center of gravity as said spectral composition of said illuminating light, said limited spectral composition of said restricted light consisting of a plurality of bright spectral bands separated by a dark band, the spectral position of said bands being coordinated in a predetermined manner with the said spectral composition of said objective color, said spectral composition of said objective color being substantially included in one of said spectral bands of said restricted light, whereby the light from said scene is in general restricted and reduced, while the light from said objective color is substantially unrestricted.

92. The method of producing a visual effect which includes the steps of providing an illuminated scene, providing in said scene at will any chosen number of a plurality of objects, each having a visibly different color, each said color having a known, predetermined spectral composition, said scene being illuminated by light of known spectral composition, restricting at will, by means of a suitable filter homogeneous as to selective transmission throughout its area, the light reaching the eye from said scene to light of wavelengths included in a certain predetermined, limited spectral composition differing from that of the illuminating light, said limited spectral composition being substantially the same spectral center of gravity as said spectral composition of said illuminating light, said limited spectral composition of said restricted light consisting of a pluralty of bright spectral bands separated by a dark band, the spectral position of said bands being coordinated in a predetermined manner with the said spectral composition of said objective colors, the said limited composition including substantially all of each of the said spectral compositions respectively of the said object colors, whereby the light from said scene is in general restricted and reduced while the light of each of said objective colors is substantially unrestricted.

93. The method of producing a visual effect which includes the step of providing in a scene a certain number of a plurality of objects, each said object having a certain known, predetermined color, said colors having respectively an invisible spectral difference, the spectral composition of each said object color having the same center of gravity, and substantially the same hue, all wavelengths included in any one of said compositions being substantially excluded from all others, restricting, by means of a suitable filter, at will the light reaching the eye from said scene to a certain known spectral composition coordinated with that of each of said compositions, and different from any, but including a substantial part of each, whereby said difference in the composition of said colors is made manifest.

94. The method of producing a visual effect which includes the steps of providing in a scene a certain number of a plurality of objects, each said object having a certain known predetermined color, said colors having respectively an invisible spectral difference, the spectral composition of each said object color having the same center of gravity, and substantially the same hue, all wavelengths included in any one of said compositions being substantially excluded in all others, restricting at will, by means of one of a plurality of differing light filters, the light reaching the eye to wavelengths included in a chosen one of said compositions, observing said object well defined using the same ocular focus with any said selected filter, the light of said chosen composition being substantially unrestricted, while said other compositions are substantially excluded.

95. As an article of manufacture, for use in the coordinated projection of subjectively light of a plurality of different spectral compositions having substantially the same spectral center of gravity, a plurality of coordinated, coordinate selectively usable light filters having respectively different characteristics of selective transmission, the said selective transmission of each of the said plurality of coordinate filters having the same spectral centroid, the said selective transmission of each filter being substantially constant throughout its area, each of said filters being mounted separately and adapted to intercept a beam of light when the other said filters are excluded from the same beam.

96. The method of producing a light effect which includes the steps of providing a source of light having a predetermined spectral composition, cooperating with said light a combined spectral character imparting and character segregating element to intercept light from said source, said element including a plurality of wavelength-selective components each transmitting a single bright spectral band composed of wavelengths substantially not transmitted by any other of said selective components, the sum of the light transmitted by a certain selected number of the said components having substantially the same spectral center of gravity, and hue, as the sum of the light transmitted by the remaining said components, and cooperating with the said spectral character imparting and character segregating element a combined light combining and segregating element which includes two segregating components, said combining and segregating element being in the path of the light having said segregated bright band composition, one of said segregating components transmitting sensibly constantly all the light transmitted by said certain selected number of wavelength-selective components, another of said segregating components transmitting sensibly constantly all the light transmitted by the remaining wavelength-selective components.

In testimony whereof, I affix my signature.

WILLIAM J. WHITING.

CERTIFICATE OF CORRECTION.

Patent No. 1,768,812. Granted July 1, 1930, to

WILLIAM J. WHITING.

It is hereby certified that error appears in the printed specification of the above numbered patent requiring correction as follows: Page 1, line 67, for the misspelled word "especally" read especially; page 5, lines 42 and 115, for "special" read spectral; page 6, line 81, for "differerences" read differences; page 7, line 88, for "fo" read of; lines 93 and 94, for "stetroscopic read stereoscopic; page 11, lines 100 and 101, claim 9, after "components" strike out the comma; page 19, line 15, claim 46, before the word "substantially" insert the article a; line 44, claim 47, for "charactertistic" read characteristic; page 28, line 112, claim 89, for "segragated" read segregated; and that the said Letters Patent should be read with these corrections therein that the same may conform to the record of the case in the Patent Office.

Signed and sealed this 28th day of October, A. D. 1930.

(Seal)

M. J. Moore,
Acting Commissioner of Patents.